(12) United States Patent
Lee et al.

(10) Patent No.: US 11,487,663 B2
(45) Date of Patent: Nov. 1, 2022

(54) METHOD OF OPERATING STORAGE DEVICE, STORAGE DEVICE PERFORMING THE SAME AND STORAGE SYSTEM INCLUDING THE SAME

(71) Applicant: SAMSUNG ELECTRONICS CO., LTD., Suwon-si (KR)

(72) Inventors: Yong-Myung Lee, Hwaseong-si (KR); Seung-Uk Shin, Seoul (KR); Jin-Young Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 16/444,998

(22) Filed: Jun. 18, 2019

(65) Prior Publication Data

US 2020/0104257 A1    Apr. 2, 2020

(30) Foreign Application Priority Data

Sep. 27, 2018    (KR) .................. 10-2018-0114813

(51) Int. Cl.
*G06F 11/20* (2006.01)
*G06F 12/0804* (2016.01)
*G06F 12/10* (2016.01)

(52) U.S. Cl.
CPC ...... *G06F 12/0804* (2013.01); *G06F 11/2094* (2013.01); *G06F 12/10* (2013.01); *G06F 2201/82* (2013.01); *G06F 2212/608* (2013.01); *G06F 2212/657* (2013.01)

(58) Field of Classification Search
CPC ... G06F 11/2094; G06F 12/0804; G06F 12/10

USPC ................ 714/6.2, 6.22, 6.23, 6.24
See application file for complete search history.

(56) References Cited

U.S. PATENT DOCUMENTS

| 7,240,235 B2 | 7/2007 | Lewalski-Brechter |
| 7,533,298 B2 | 5/2009 | Smith et al. |
| 8,321,631 B2 | 11/2012 | Baek |
| 8,838,893 B1 | 9/2014 | Randall et al. |

(Continued)

FOREIGN PATENT DOCUMENTS

| EP | 3629142 A2 | 1/2020 |
| KR | 0981064 | 9/2010 |

(Continued)

OTHER PUBLICATIONS

Partial Search Report dated Dec. 10, 2019 from the European Patent Office for counterpart European Patent Application No. 19177544.4.

(Continued)

*Primary Examiner* — Chae M Ko
(74) *Attorney, Agent, or Firm* — Volentine, Whitt & Francos, PLLC

(57) ABSTRACT

In a method of operating a storage device including a plurality of disks, the plurality of disks is divided into a plurality of journal areas and a plurality of data areas, respectively. When a write command for target disks among the plurality of disks is received, a first write operation is performed to store target data to be written into journal areas of the target disks. The target disks are included in a same array. After the first write operation is completed, a second write operation is performed to store the target data into data areas of the target disks.

20 Claims, 41 Drawing Sheets

(56) References Cited

U.S. PATENT DOCUMENTS

| | | | |
|---|---|---|---|
| 9,229,809 B2 | 1/2016 | Moss et al. | |
| 9,286,175 B2 | 3/2016 | Samanta et al. | |
| 9,396,067 B1* | 7/2016 | Subramanian | G06F 3/0659 |
| 2004/0172509 A1* | 9/2004 | Takeda | G06F 11/2066 711/162 |
| 2007/0083567 A1* | 4/2007 | Arai | G06F 11/1435 |
| 2010/0138603 A1 | 6/2010 | Mukker | |
| 2014/0095758 A1* | 4/2014 | Smith | G06F 3/0685 710/308 |
| 2014/0337562 A1* | 11/2014 | Long | G06F 3/0685 711/126 |
| 2015/0046670 A1 | 2/2015 | Kim et al. | |
| 2016/0259693 A1* | 9/2016 | Sundararaman | G06F 16/2365 |
| 2018/0052768 A1 | 2/2018 | Bae et al. | |

FOREIGN PATENT DOCUMENTS

| | | | | |
|---|---|---|---|---|
| WO | WO-2007128005 A2 * | 11/2007 | | G06F 11/1084 |
| WO | WO2013036265 A1 | 3/2013 | | |

OTHER PUBLICATIONS

Indonesian Office Action dated Aug. 27, 2021 Cited in Corresponding Application No. PID201904982.

* cited by examiner

FIG. 25

| DISK | STRIPE | FINAL LOCATION BLOCK ADDRESS | ATTRIBUTE |
|---|---|---|---|
| DISK1 | STR0 | 50000 | EST |
| DISK1 | STR1 | 60000 | NEST |
| DISK1 | STR2 | 70000 | EST |
| DISK1 | STR3 | 80000 | EST/PRT/NADDR |
| DISK2 | STR0 | - | EST |
| DISK2 | STR1 | - | EST |
| DISK2 | STR2 | - | NEST |
| DISK2 | STR3 | - | EST |
| DISK3 | STR0 | - | EST |
| DISK3 | STR1 | - | EST/PRT |
| DISK3 | STR2 | - | NEST |
| DISK3 | STR3 | - | EST |
| ⋮ | ⋮ | ⋮ | ⋮ |

METHOD OF OPERATING STORAGE DEVICE, STORAGE DEVICE PERFORMING THE SAME AND STORAGE SYSTEM INCLUDING THE SAME

CROSS-REFERENCE TO RELATED APPLICATION

This application claims priority under 35 USC § 119 to Korean Patent Application No. 10-2018-0114813, filed on Sep. 27, 2018 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of operating storage devices, storage devices performing the methods, and storage systems including the storage devices.

2. Description of the Related Art

A storage system includes a host device and a storage device, and the storage device may be a memory system including a memory controller and a memory device or including only a memory device. In the storage system, the host device and the storage device are connected to each other through various interface standards, such as universal flash storage (UFS), serial advanced technology attachment (SATA), small computer system interface (SCSI), serial attached SCSI (SAS), embedded multi-media card (eMMC), etc.

Recently, many storage systems use a journaling scheme for data durability and performance purposes. Such storage systems store two copies of data: one in a journal section and the other one in a data section. In such storage systems, an additional element or device may be required to establish the journal section.

SUMMARY

At least one example embodiment of the present disclosure provides a method of operating a storage device capable of preventing a write-hole in a data write operation.

At least one example embodiment of the present disclosure provides a storage device performing the method and capable of preventing a write-hole in a data write operation.

At least one example embodiment of the present disclosure provides a storage system including the storage device.

According to example embodiments, in a method of operating a storage device including a plurality of disks, the plurality of disks is divided into a plurality of journal areas and a plurality of data areas, respectively. When a write command for target disks among the plurality of disks is received, a first write operation is performed to store target data to be written into journal areas of the target disks. The target disks are included in a same array. After the first write operation is completed, a second write operation is performed to store the target data into data areas of the target disks.

According to example embodiments, a storage device includes a plurality of disks configured to be divided into a plurality of journal areas and a plurality of data areas, respectively. When a write command for target disks among the plurality of disks is received, a first write operation is performed to store target data to be written into journal areas of the target disks, the target disks are included in a same array. After the first write operation is completed, a second write operation is performed to store the target data into data areas of the target disks.

According to example embodiments, a storage system includes a host device and a storage device. The storage device is controlled by the host device and includes a plurality of disks divided into a plurality of journal areas and a plurality of data areas, respectively. When a write command and target data to be written are provided from the host device, the storage device performs a first write operation to store the target data into journal areas of target disks among the plurality of disks and a second write operation to store the target data into data areas of the target disks after the first write operation is completed. The target disks are included in a same array.

According to example embodiments, a method executed by a nonvolatile memory system includes: (1) receiving a first write command from a host device that is external to the nonvolatile memory system; (2) executing a first write operation, in response to the first write command, that writes first target data received from the host device into a first physical location of the nonvolatile memory system associated with a first logical address; and (3) executing a second write operation, after completing the first write command, so that a physical address of the nonvolatile memory system in which the first target data is stored is identified by a second logical address, which differs from the first logical address.

In the method of operating the storage device, an in-disk journaling scheme may be implemented such that each of the plurality of disks has a journal area for itself and the journaling scheme may be employed without an additional element or device in the storage device. In addition, a replay write operation or a data recovery operation may be efficiently performed based on the journaling scheme (e.g., the in-disk journaling scheme) when a power failure and/or a disk failure occurs. Accordingly, the performance and data reliability of the storage device may be improved or enhanced.

BRIEF DESCRIPTION OF THE DRAWINGS

Illustrative, non-limiting example embodiments will be more clearly understood from the following detailed description taken in conjunction with the accompanying drawings.

FIG. 25 is a diagram illustrating an example of a meta block included in the journal area of FIG. 24.

DETAILED DESCRIPTION OF THE EMBODIMENTS

Figure 1:
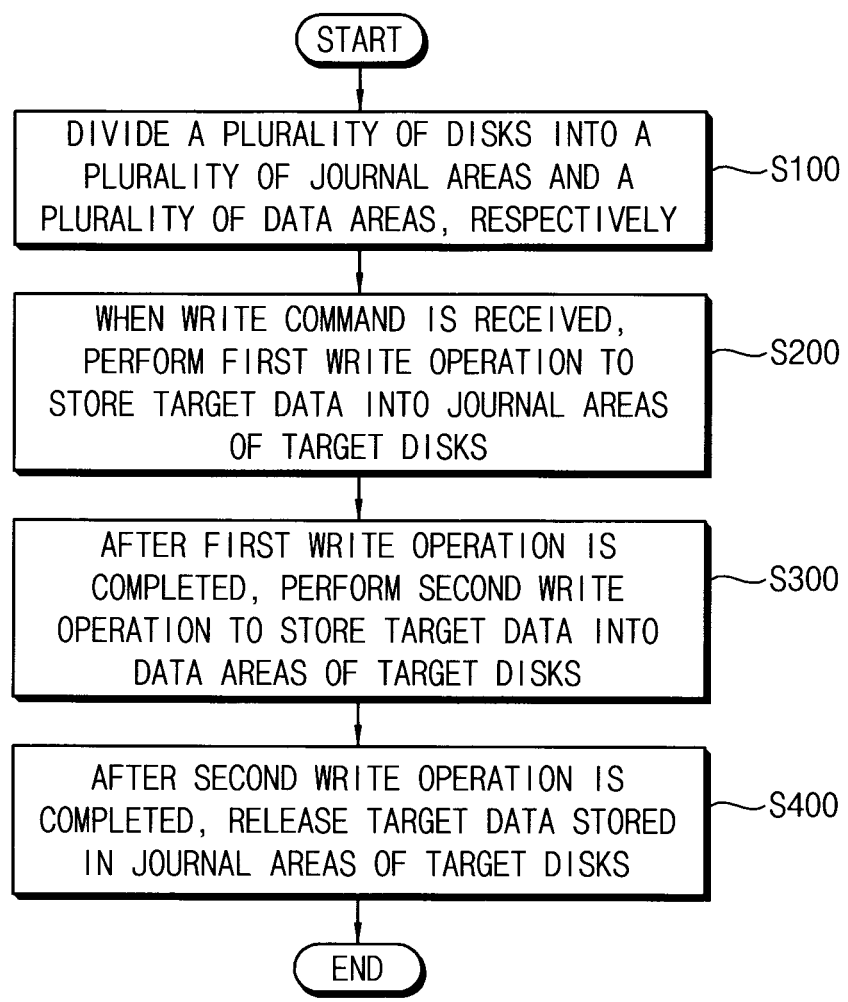
FIG. 1 is a flowchart illustrating a method of operating a storage device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of operating a storage device according to example embodiments.

Referring to FIG. 1, a storage device that performs or executes a method according to example embodiments includes a plurality of disks. Each of the plurality of disks forms an independent storage space.

In addition, the storage device is provided with a redundant array of independent disks (RAID) architecture to increase operating speed and stability. The storage device having a RAID architecture usually includes the plurality of disks (e.g., a plurality of nonvolatile memory devices), and input data is distributed over the plurality of disks. The storage device having a RAID architecture is able to increase operating speed by accessing the plurality of disks in parallel (or simultaneously). Further, the storage device having a RAID architecture is able to store parity data along with input data. Therefore, although physical errors occur during the writing of data to and/or reading of data from the plurality of disks, the storage device having a RAID architecture is able to recover errant (or "damaged") data using the co-stored parity data. As such, the storage device having a RAID architecture offers increased data reliability or stability.

In the method of operating the storage device according to example embodiments, the plurality of disks is divided into a plurality of journal areas and a plurality of data areas, respectively (step S100). In other words, each of the plurality of disks may internally have the journal area or a write journal for itself (e.g., to temporarily store data by itself).

In some example embodiments, step S100 may be performed at a time of manufacturing the storage device or at an initial operation time of the storage device to set the plurality of journal areas and the plurality of data areas in the plurality of disks. After the time of manufacturing the storage device or the initial operation time of the storage device, step S100 may be replaced by loading a result of setting the plurality of journal areas and the plurality of data areas.

When a write command for target disks among the plurality of disks is received, a first write operation is performed to store target data to be written into journal areas of the target disks (step S200). The target disks are included in the same array (e.g., the same array of a RAID architecture). After the first write operation is completed, a second write operation is performed to store the target data into data areas of the target disks (step S300). In other words, the target data may be written into the journal areas first, and then the target data may be written into the data areas (e.g., final locations) after the write operation for the journal areas is completed.

After the second write operation is completed, the target data stored in the journal areas of the target disks may be released (step S400). If the second write operation is successfully completed, the target data stored in the journal areas of the target disks may be no longer needed, and thus the target data may be released from the journal areas.

The storage device according to example embodiments is driven based on a journaling scheme or a journaling file system. In the journaling scheme, an area named "journal" is prepared. When a specific write operation occurs, data and/or metadata are first stored in the journal area without being stored directly in a storage location of the storage device. All the data and metadata associated with one write operation are stored in the journal area, and a stream of such data and metadata is grouped into a unit of transaction. In this manner, several transactions are written into the journal area, and then a specific transaction written completely in the journal area is written into the storage location (e.g., the final location of the data area) of the storage device based on a background job, work or task. If all the data and metadata included in the specific transaction are completely stored in the data area, the specific transaction is deleted from the journal area for a space of the journal area required for another write operation.

In a case of using the journaling scheme as described above, consistency of the storage device may be maintained even if a power failure occurs on the storage device. For example, if a specific write operation is interrupted by the power failure, the results of the specific write operation will remain in the data and journal areas, respectively. According to the journaling file system, a write operation that has been written to the data area but has been interrupted may be a job that exists in a form of a transaction written entirely and completely in the journal area. In this example, the interrupted write operation may be quickly completed by scanning the journal area when rebooting or remounting the storage device. Another write operation may have been interrupted while being written in the journal area. In this example, an incomplete transaction would have been stored in the journal area, and consistency of the file system may be maintained by ignoring the incomplete transaction when rebooting or remounting the storage device. In other words, the consistency of the storage device may be maintained by taking steps to recover or ignore all cases that may occur in the event of the power failure.

In the method of operating the storage device according to example embodiments, an in-disk journaling scheme may be implemented such that each of the plurality of disks has the journal area for itself, and the journaling scheme may be employed without an additional element or device in the storage device. In addition, a replay write operation or a data recovery operation may be efficiently performed based on the journaling scheme (e.g., the in-disk journaling scheme) when a power failure and/or a disk failure occurs. Accordingly, the performance and data reliability of the storage device may be improved or enhanced.

Figure 2:
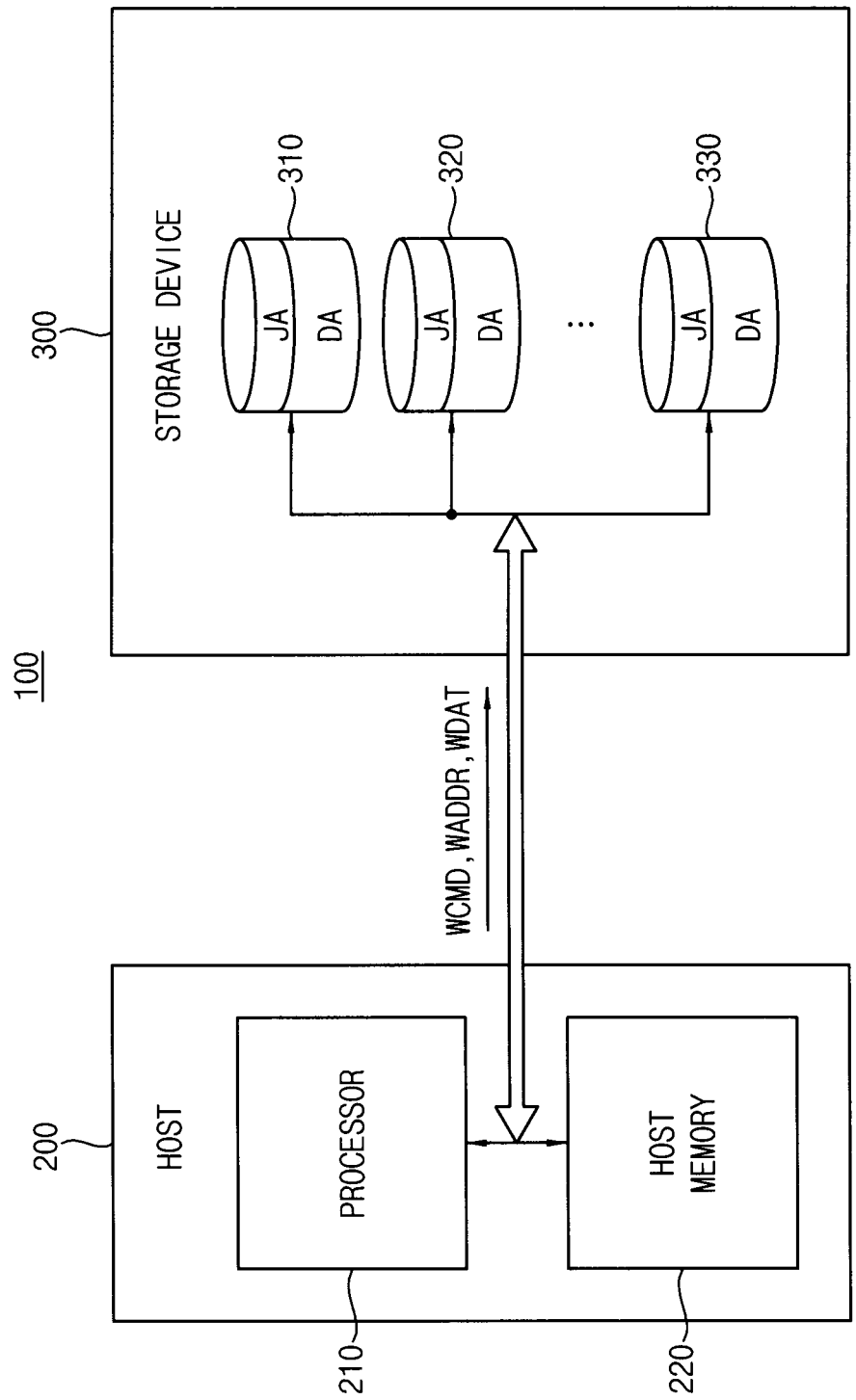
FIG. 2 is a block diagram illustrating a storage device and a storage system including the storage device according to example embodiments.

FIG. 2 is a block diagram illustrating a storage device and a storage system including the storage device according to example embodiments.

Referring to FIG. 2, a storage system 100 includes a host device 200 and a storage device 300.

The host device 200 controls overall operations of the storage system 100. The host device 200 may include a processor 210 and a host memory 220.

The processor 210 may control an operation of the host device 200. For example, the processor 210 may execute an operating system (OS). The operating system may include a file system for file management and a device driver for controlling peripheral devices including the storage device 300 at the operating system level. For example, the processor 210 may include at least one of various processing units, e.g., a central processing unit (CPU), or the like.

The host memory 220 may store instructions and/or data that are executed and/or processed by the processor 210. The host memory 220 may be an arbitrary memory device having a relatively high or rapid operating speed. For example, the host memory 220 may include at least one of various volatile memory devices, e.g., a dynamic random access memory (DRAM), or the like.

The storage device 300 is accessed by the host device 200 and includes a plurality of disks 310, 320, . . . , 330. Each of the plurality of disks 310~330 is divided into a respective journal area JA and a respective data area DA. As described above, the data area DA is a region where data is to be actually stored and the journal area JA is a region for the journaling scheme where the data is temporarily and preliminarily stored before being stored in the data area DA. For example, a size of the data area DA may be larger than a size of the journal area JA.

Each of the plurality of disks 310-330 may be an independent storage space. Each of the plurality of disks 310-330 may be an arbitrary memory device that may be accessed by the host device 200 by units of a memory block. For example, each of the plurality of disks 310-330 may include at least one of various nonvolatile memory devices, e.g., an electrically erasable programmable read only memory (EE-PROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

In some example embodiments, each of the plurality of disks 310~330 may include only one nonvolatile memory device. In other example embodiments, each of the plurality of disks 310~330 may include a plurality of nonvolatile memory devices and a memory controller for controlling the plurality of nonvolatile memory devices. For example, each of the plurality of disks 310-330 may be one of a solid state drive (SSD), a multi media card (MMC), an embedded multi media card (eMMC), a universal flash storage (UFS), or the like.

When a write command WCMD, a write address WADDR and target data WDAT to be written are provided from the host device 200, the storage device 300 performs a first write operation to store the target data WDAT into journal areas JA of target disks included in the same array and performs a second write operation to store the target data WDAT into data areas DA of the target disks after the first write operation is completed. The storage device 300 may release the target data WDAT stored in the journal areas JA of the target disks after the second write operation is completed. In other words, the storage device 300 may perform or execute steps S100, S200, S300 and S400 in FIG. 1 based on a request from the host device 200.

In some example embodiments, the storage device 300 may be connected to the host device 200 through a block accessible interface which may include for example a serial advanced technology attachment (SATA) bus, a nonvolatile memory express (NVMe) bus, a serial attached SCSI (SAS) bus, or the like. The storage device 300 may use a block accessible address space corresponding to an access size of the plurality of disks 310-330 to provide the block accessible interface to the host device 200, for allowing the access by units of a memory block with respect to data stored in the plurality of disks 310-330.

In some example embodiments, the storage system 100 of FIG. 2 may be a software RAID system where a RAID architecture is provided on the operating system of the host device 200 without an additional RAID controller.

Figure 3:
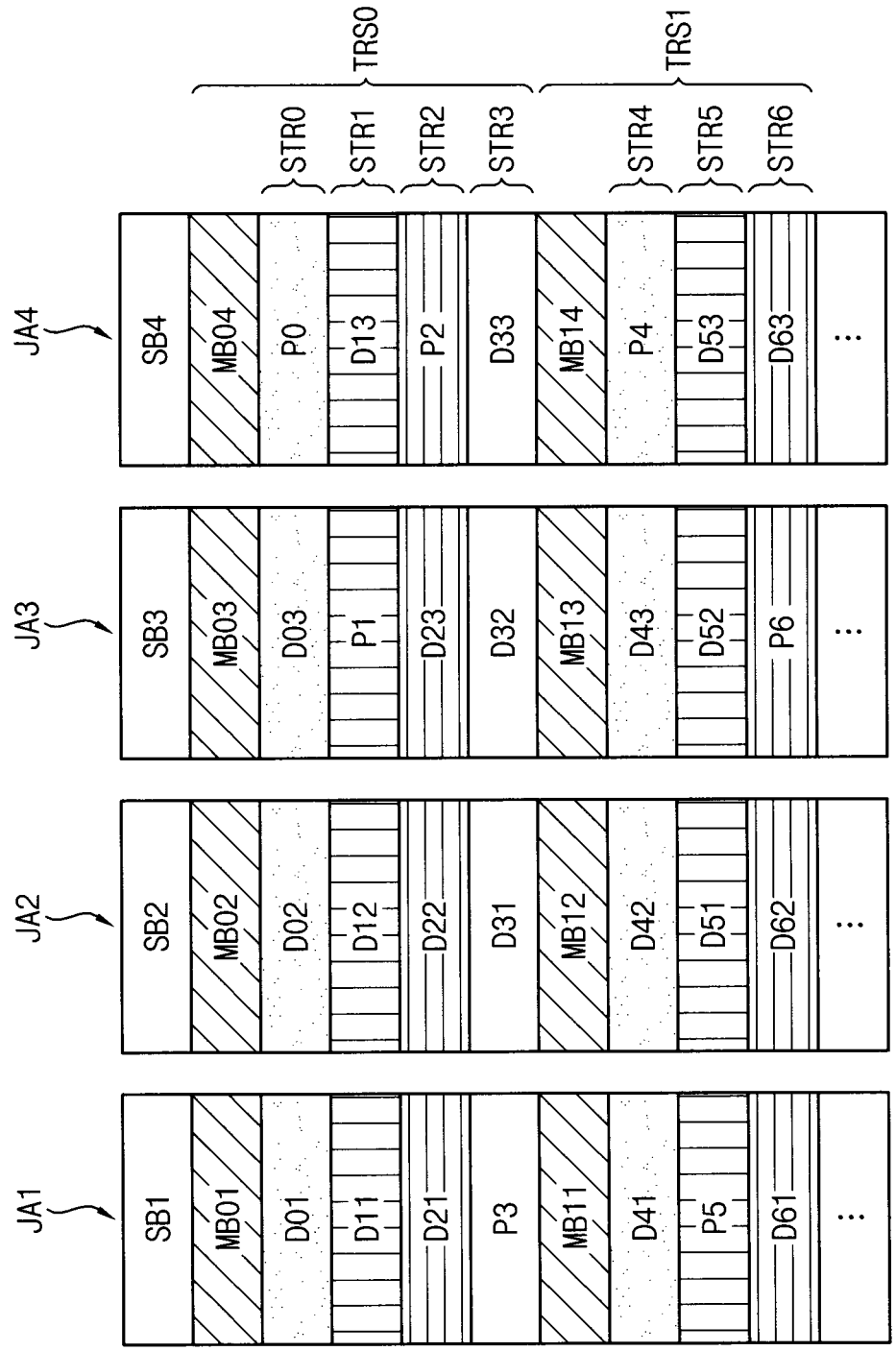
FIG. 3 is a diagram illustrating an example of a journal area included in a storage device according to example embodiments.

FIG. 3 is a diagram illustrating an example of a journal area included in a storage device according to example embodiments.

FIG. 3 illustrates four journal areas JA1, JA2, JA3 and JA4 that are included in four disks (e.g., DISK1, DISK2, DISK3 and DISK4 in FIG. 5A), respectively. Hereinafter, example embodiments will be described based on an example where four disks form one array (e.g., a group of disks) and a write operation is performed for four disks in one array at one time (e.g., an example where the target disks include four disks).

Referring to FIG. 3, the journal areas JA1~JA4 may include super blocks SB1, SB2, SB3 and SB4, meta blocks MB01, MB02, MB03, MB04, MB11, MB12, MB13 and MB14, and data blocks D01, D02, D03, P0, D11, D12, P1, D13, D21, D22, D23, P2, P3, D31, D32, D33, D41, D42, D43, P4, P5, D51, D52, D53, D61, D62, P6 and D63.

Hereinafter, the term "data block" may be used to include both a block for storing actual data to be stored and a block for storing parity data with respect to the actual data. In some cases, only a block storing actual data to be stored may be referred to as a data block, and a block storing parity data may be referred to as a parity block.

A write operation for the storage device 300 may be performed by units of a stripe and by units of a transaction. The stripe may represent a unit to be written into the target disks at one time. As described with reference to FIG. 1, the transaction may represent a unit to group or bundle specific data for the journaling scheme. One stripe may include actual data to be stored and parity data with respect to the actual data. One transaction may include two or more stripes.

In an example of FIG. 3, the data blocks D01, D02, D03 and P0 may form the stripe STR0, the data blocks D11, D12, P1 and D13 may form the stripe STR1, the data blocks D21, D22, D23 and P2 may form the stripe STR2, the data blocks P3, D31, D32 and D33 may form the stripe STR3, the data blocks D41, D42, D43 and P4 may form the stripe STR4, the data blocks P5, D51, D52 and D53 may form the stripe STR5, and the data blocks D61, D62, P6 and D63 may form the stripe STR6. In addition, the stripes STR0, STR1, STR2 and STR3 may form the transaction TRS0, and the stripes STR4, STR5 and STR6 may form the transaction TRS1. The last number in a reference numeral of each transaction may denote a transaction identification (ID). For example, the transaction ID may sequentially increase.

The super blocks SB1~SB4 may store key or major information of the journal areas JA1~JA4. For example, each of the super blocks SB1~SB4 may store initial transaction information associated with an initial transaction indicating a start point of a replay write operation and size information of each of the journal areas JA1~JA4. The initial transaction may be the first transaction valid at the time of performing the replay write operation due to a power failure or a system crash. For example, the initial transaction information may include ID information of the initial transaction and commit information indicating a block offset within the journal area of the initial transaction. For example, one journal area may include one super block.

The meta blocks MB01~MB14 may store information associated with a current transaction (e.g., a corresponding or each transaction), and particularly to information required for the current transaction and information of each block included in the current transaction. For example, the information associated with the current transaction may include ID information of the current transaction, final location block address information of the current transaction, attribute information of the current transaction, and checksum information for checking validity of meta data and data blocks in the current transaction. For example, the number of meta blocks in one journal area may be substantially equal to the number of transactions.

The data blocks D01~D63 may store data of the current transaction. For example, the data of the current transaction may include actual data to be stored and parity data with respect to the actual data. The first alphabetic characters "D" and "P" in a reference numeral of each data block may denote the actual data and the parity data, respectively.

For example, the first super block SB1 may store key or major information of the first journal area JA1. The first super block SB1 may include first initial transaction information associated with a first initial transaction of the first journal area JA1 (e.g., ID information and commit information of the first initial transaction) and size information of the first journal area JA1. For example, if the first initial transaction is the transaction TRS1, the ID information of the first initial transaction may be "1," and the commit information of the first initial transaction may be "6" which is the number of blocks from the first super block SB1 to the meta block MB11 of the transaction TRS1. Similarly, the second, third and fourth super blocks SB2~SB4 may store key or major information of the second, third and fourth journal areas JA2~JA4, respectively.

The meta block MB01 may store information associated with the transaction TRS0. In the meta block MB01, ID information of the current transaction may be "0," final location block address information of the current transaction may include block addresses (e.g., physical addresses) in which the data blocks D01, D11, D21 and P3 are to be stored in a first data area of a first disk including the first journal area JA1, attribute information of the current transaction may include attributes of the data blocks D01, D11, D21 and P3, and checksum information of the current transaction may include checksums for checking validity of the data blocks D01, D11, D21 and P3. Similarly, the meta blocks MB02, MB03 and MB04 may store information associated with the transaction TRS0, respectively, and the meta blocks MB11, MB12, MB13 and MB14 may store information associated with the transaction TRS1, respectively.

In some example embodiments, at least a part of the information stored in the super blocks SB1~SB4 and the meta blocks MB01~MB14 may be shared by the target disks included in the same array. For example, the initial transaction information among the information stored in the super blocks SB1~SB4 may be shared by the target disks, and the final location block address information and the attribute information of the current transaction stored in the meta blocks MB01~MB14 may be shared by the target disks included in the same array.

In other words, the first super block SB1 may store the first initial transaction information for the first journal area JA1 and may also store the initial transaction information for the other journal areas JA2~JA4. In addition, the meta block MB01 may store the final location block addresses and the attributes of the data blocks D01, D11, D21 and P3 and may also store the final location block addresses and the attributes of the other data blocks D02, D12, D22, D31, D03, P1, D23, D32, P0, D13, P2 and D33 included in the same transaction (e.g., TRS0). As will be described later, such shared information may be used for a replay write operation and/or a data recovery operation performed after a power failure and/or a disk failure.

Figure 4:
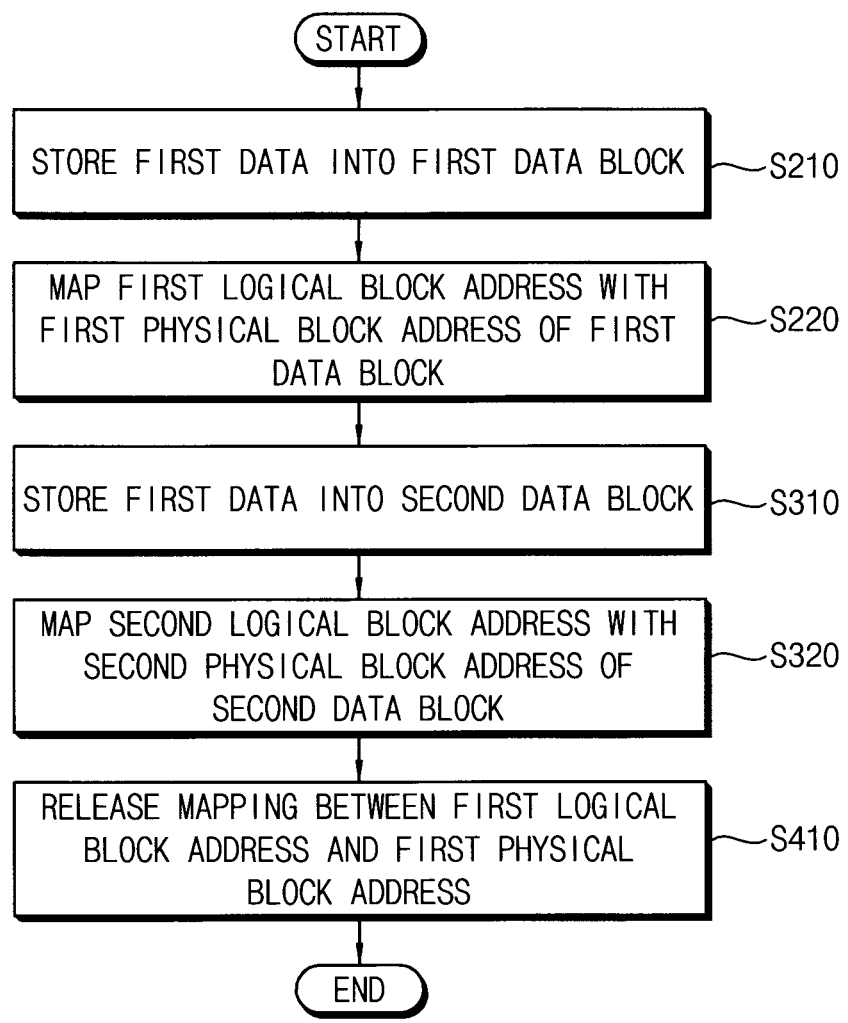
FIG. 4 is a flowchart illustrating an example of performing a first write operation and a second write operation in the method of FIG. 1.

FIG. 4 is a flowchart illustrating an example of performing a first write operation and a second write operation in the method of FIG. 1. FIGS. 5A, 5B, 5C, 5D and 6 are diagrams for describing the first write operation and the second write operation in FIG. 4.

Figure 5A:
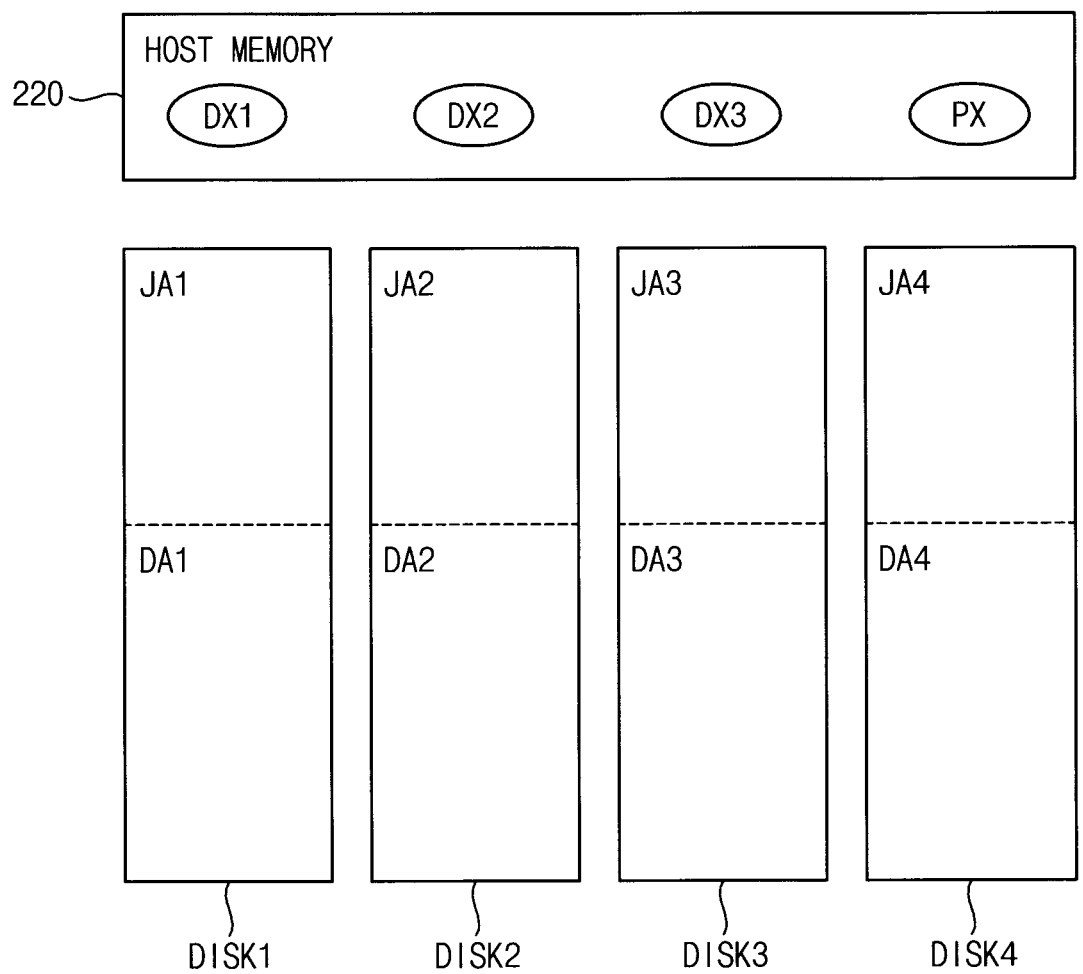
FIGS. 5A, 5B, 5C, 5D and 6 are diagrams for describing the first write operation and the second write operation in FIG. 4.

Referring to FIGS. 1, 4, 5A, 5B, 5C, 5D and 6, when performing the first write operation and the second write operation, target data DX1, DX2, DX3 and PX to be written may be prepared first in the host memory 220 included in the host device 200, as illustrated in FIG. 5A. For example, the target data DX1, DX2, DX3 and PX may correspond to one stripe.

Figure 5B:
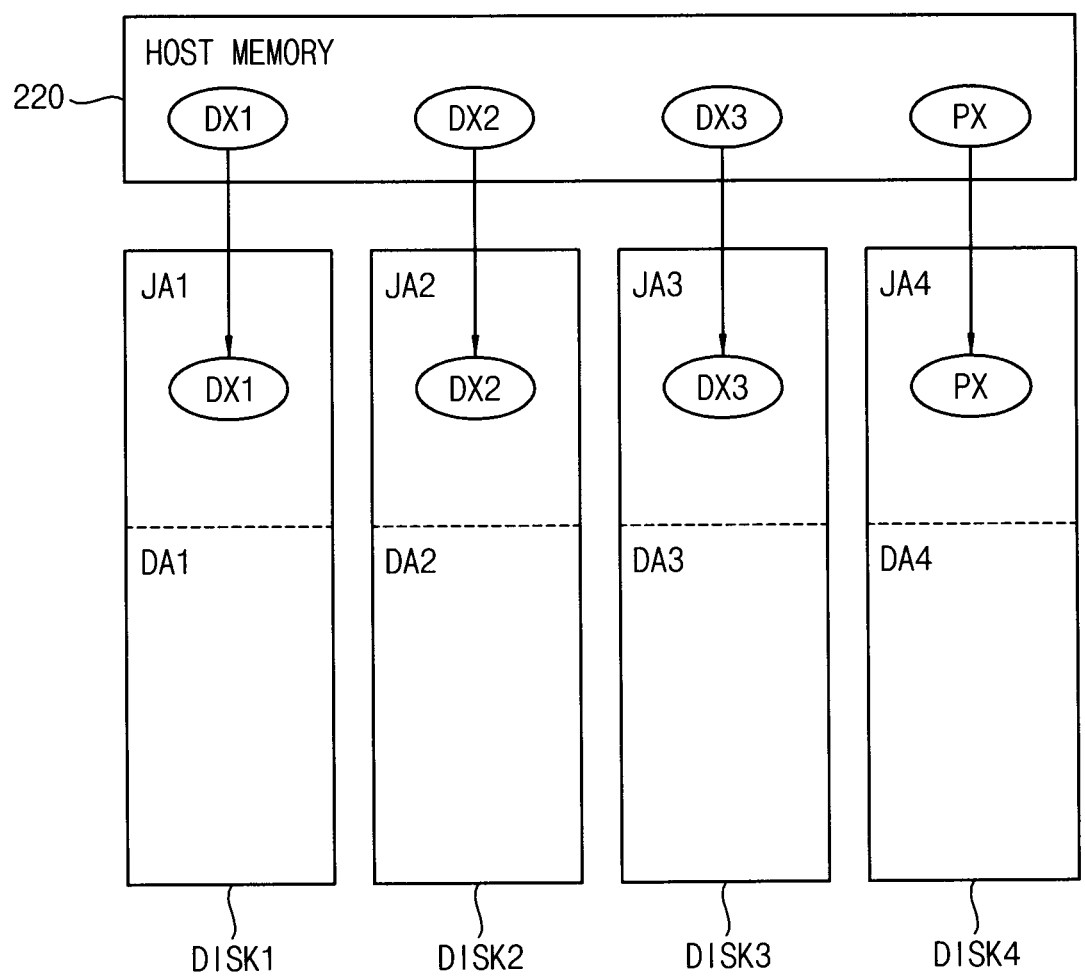

Based on a write command (e.g., WCMD in FIG. 2), the first write operation may be performed to store the target data DX1, DX2, DX3 and PX into the journal areas JA1~JA4 of the target disks DISK1~DISK4 at one time (step S200), as illustrated in FIG. 5B. The target data DX1, DX2, DX3 and PX may be provided from the host memory 220 external to the storage device 300 during the first write operation.

Figure 6:
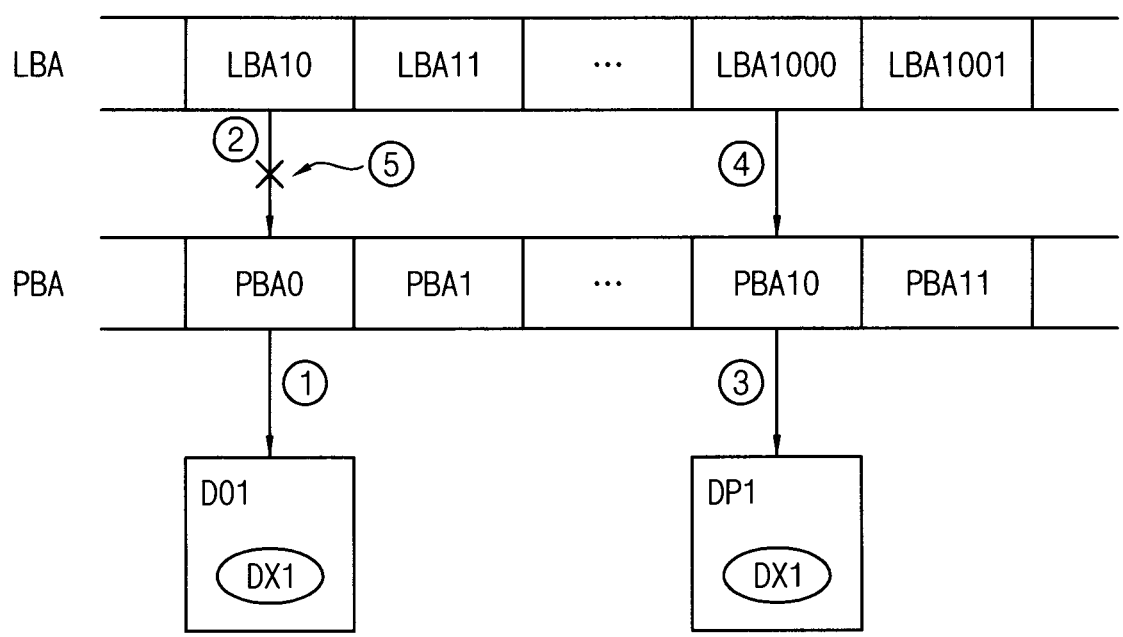

For example, the first data DX1 included in the target data DX1, DX2, DX3 and PX may be stored into a first data block D01 included in the first disk DISK1 among the target disks DISK1~DISK4 (step S210), as illustrated in FIG. 6. The first data block D01 may have a first physical block address PBA0 among physical block addresses PBA0, PBA1, PBA10, PBA11. In addition, a first logical block address LBA10 among logical block addresses LBA10, LBA11, . . . , LBA1000, LBA1001 may be mapped with the first physical block address PBA0 of the first data block D01 (step S220). The first logical block address LBA10 may indicate the journal area JA1 of the first disk DISK1. An arrow ① in FIG. 6 may correspond to step S210 in FIG. 4, and an arrow ② in FIG. 6 may correspond to step S220 in FIG. 4.

Similarly, the other data DX2, DX3 and PX may be stored into data blocks included in the other disks DISK2~DISK4, respectively, and corresponding logical block addresses may be mapped with corresponding physical block addresses, respectively.

Figure 5C:
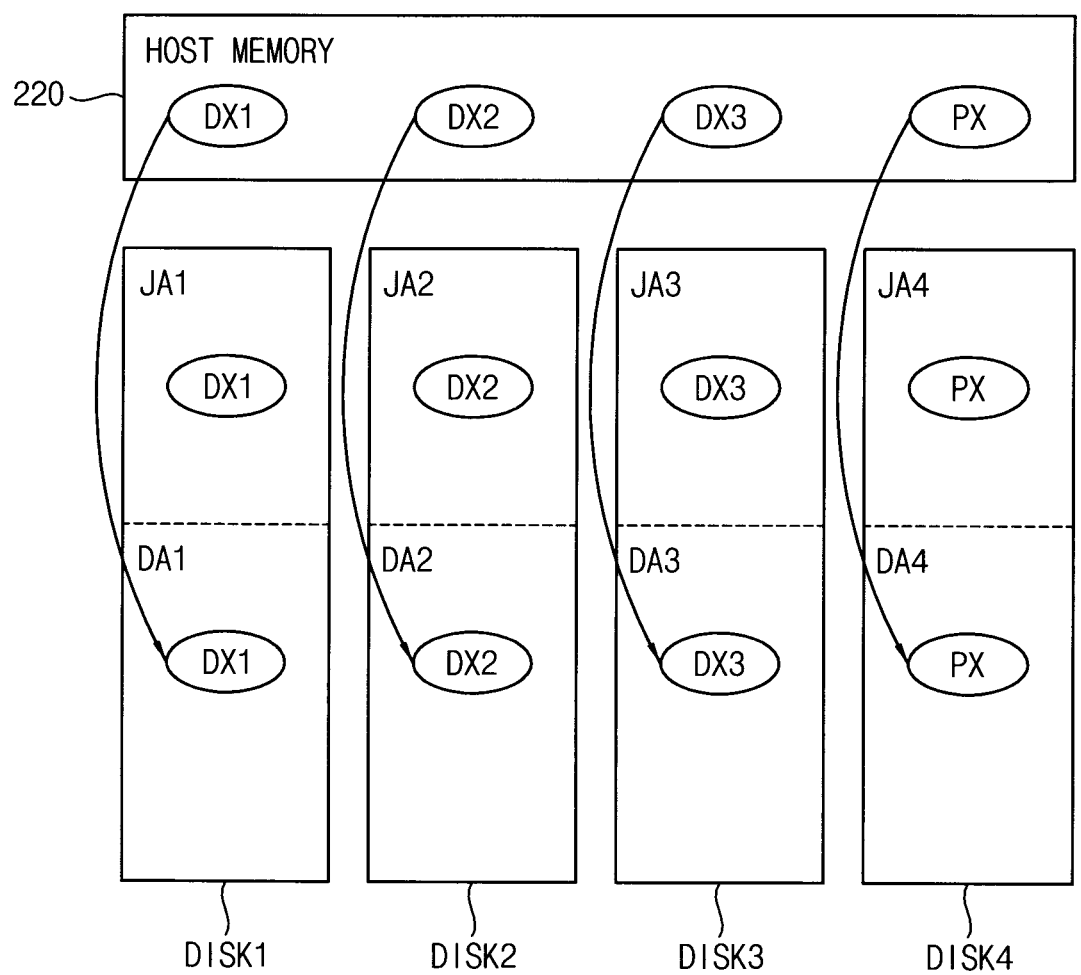

After the first write operation is completed, the second write operation may be performed to store the target data DX1, DX2, DX3 and PX into the data areas DA1~DA4 of the target disks DISK1~DISK4 at one time (step S300), as illustrated in FIG. 5C. In an example of FIG. 4, the target data DX1, DX2, DX3 and PX may be provided from the host memory 220 external to the storage device 300 during the second write operation.

For example, the first data DX1 may be stored into a second data block DP1 included in the first disk DISK1 (step S310), as illustrated in FIG. 6. The second data block DP1 may be distinguished from the first data block D01 and may have a second physical block address PBA10 different from the first physical block address PBA0. In addition, a second logical block address LBA1000 different from the first logical block address LBA10 may be mapped with the second physical block address PBA10 of the second data block DP1 (step S320). The second logical block address LBA1000 may indicate the data area DA1 of the first disk DISK1. An arrow ③ in FIG. 6 may correspond to step S310 in FIG. 4, and an arrow ④ in FIG. 6 may correspond to step S320 in FIG. 4.

Similarly, the other data DX2, DX3 and PX may be stored into other data blocks included in the other disks DISK2~DISK4, respectively, and corresponding logical block addresses may be mapped with corresponding physical block addresses, respectively.

Figure 5D:
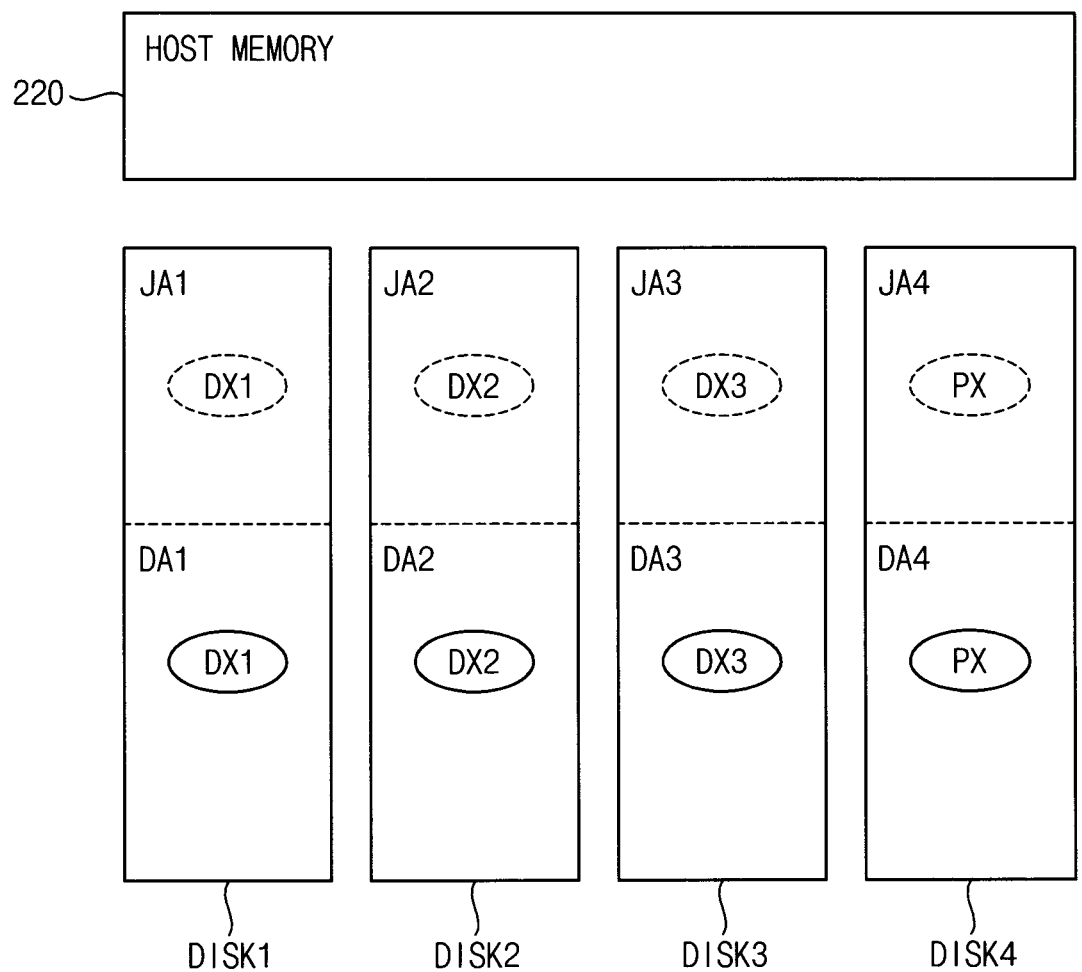

After the second write operation is completed, the target data DX1, DX2, DX3 and PX may be released (step S400), as illustrated in FIG. 5D. The target data DX1, DX2, DX3 and PX in the host memory 220 may be released, and the target data DX1, DX2, DX3 and PX stored in the journal areas JA1~JA4 of the target disks DISK1~DISK4 may also be released. For example, the mapping between the first logical block address LBA10 and the first physical block address PBA0 may be released (step S410), as illustrated in FIG. 6. An X mark ⑤ in FIG. 6 may correspond to step S410 in FIG. 4.

In some example embodiments, the first data DX1 stored in the first data block D01 may not be erased or deleted while releasing the mapping in step S410. In other words, the operation of step S410 may be sufficient to release the address mapping, and the first data DX1 in the journal area JA1 may be deleted later by a background job.

In an example of FIG. 4, the target data DX1, DX2, DX3 and PX may be received twice from the external host memory 220, and the target data DX1, DX2, DX3 and PX may be physically written twice into the target disks DISK1~DISK4. In addition, the journal areas JA1~JA4 and the data areas DA1~DA4 of the target disks DISK1~DISK4 may be logically and physically distinguished from each other.

Although FIGS. 5A, 5B, 5C and 5D illustrate that the first write operation and the second write operation are continuously performed for one stripe, actually the first write operation may be performed for one transaction including a plurality of stripes and the second write operation may be performed for the same transaction after the first write operation is completed.

Figure 7:
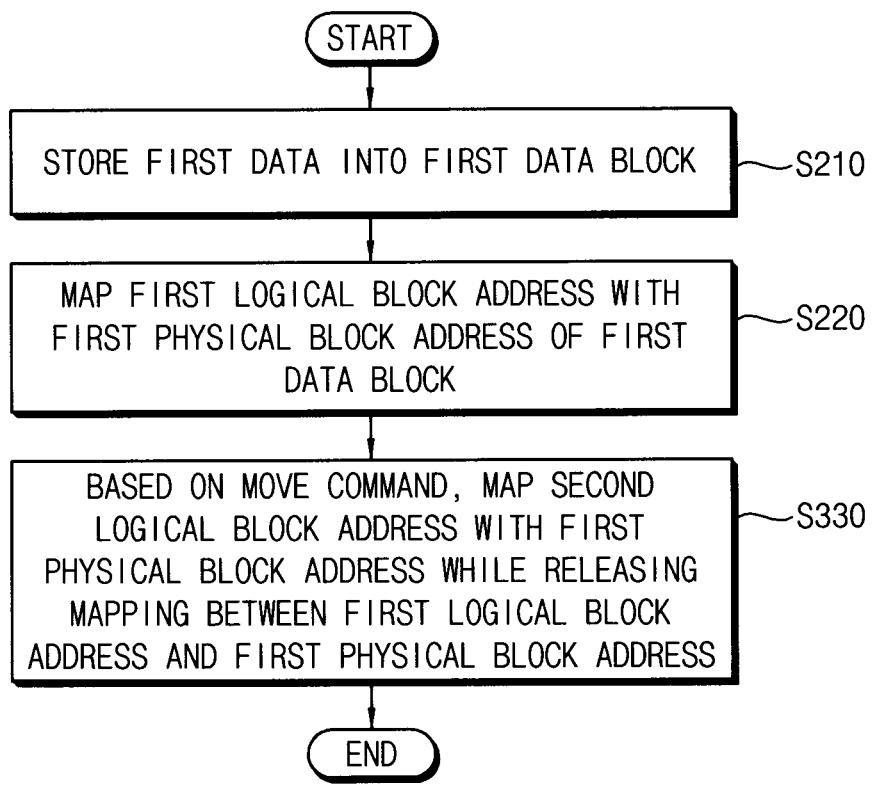
FIG. 7 is a flowchart illustrating another example of performing a first write operation and a second write operation in the method of FIG. 1.
Figure 8:
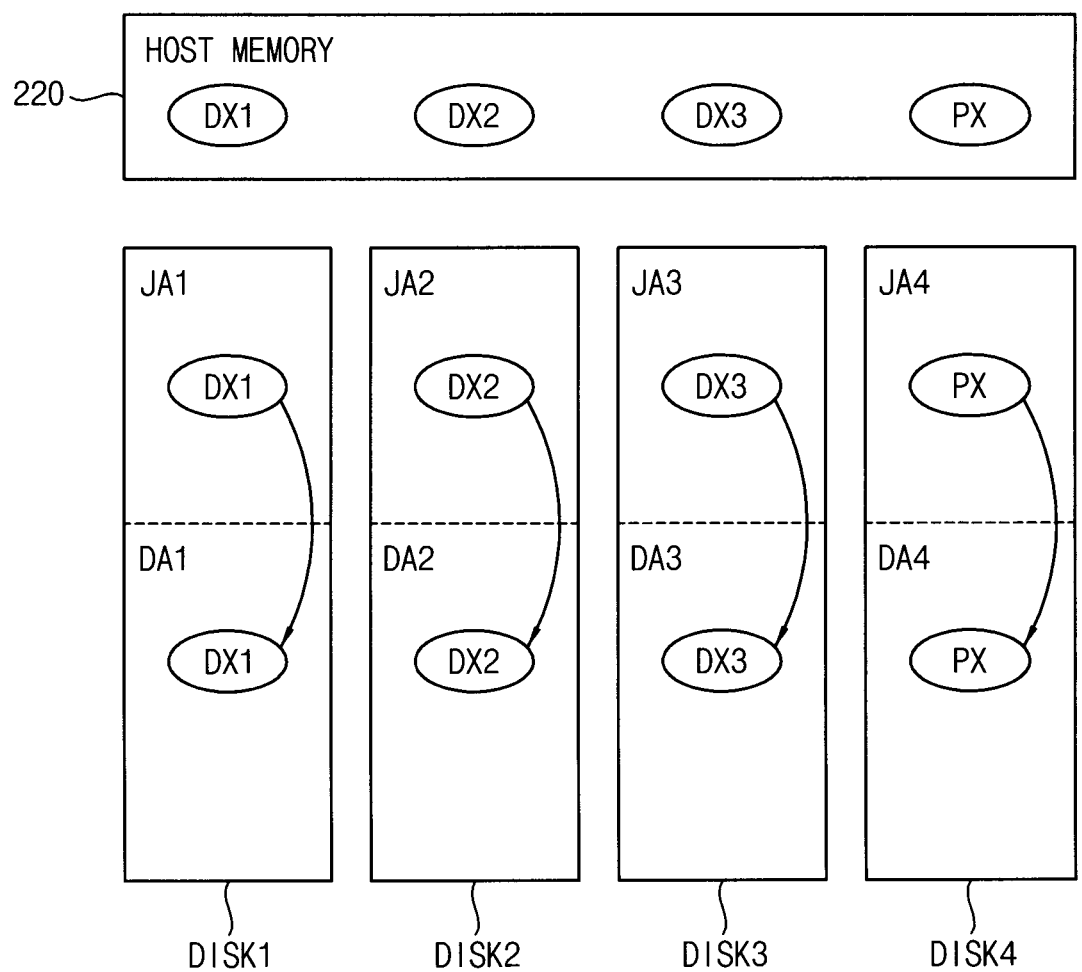
FIGS. 8 and 9 are diagrams for describing the first write operation and the second write operation in FIG. 7.
Figure 9:
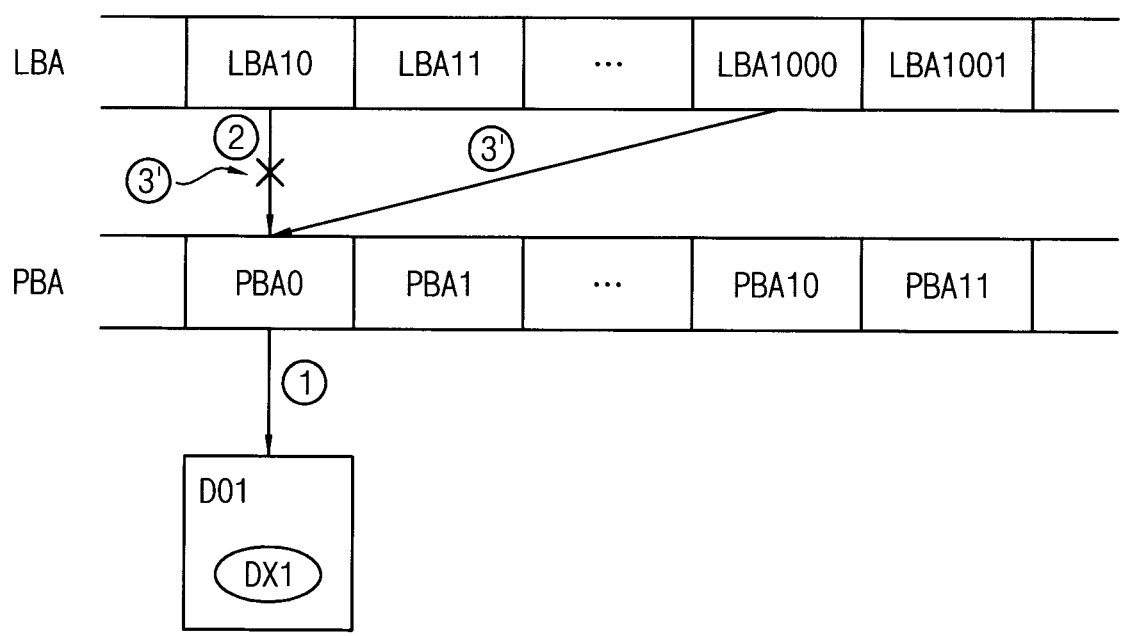

FIG. 7 is a flowchart illustrating another example of performing a first write operation and a second write operation in the method of FIG. 1. FIGS. 8 and 9 are diagrams for describing the first write operation and the second write operation in FIG. 7. The descriptions repeated with respect to FIGS. 4, 5A, 5B, 5C, 5D and 6 will be omitted.

Referring to FIGS. 1, 7, 8 and 9, the first write operation may be substantially the same as that described with reference to FIGS. 5A and 5B, and steps S210 and S220 in FIG. 7 may be substantially the same as steps S210 and S220 in FIG. 4, respectively. Arrows ① and ② in FIG. 9 may be substantially the same as the arrows ① and ② in FIG. 6, respectively.

After the first write operation is completed, the second write operation may be performed to store the target data DX1, DX2, DX3 and PX into the data areas DA1~DA4 of the target disks DISK1~DISK4 at one time (step S300), as illustrated in FIG. 8. In an example of FIG. 7, the target data DX1, DX2, DX3 and PX may be internally provided in the storage device 300, not from the external host memory 220, during the second write operation.

For example, the second logical block address LBA1000 indicating the data area DA1 of the first disk DISK1 may be mapped with the first physical block address LBA10 of the first data block D01 while releasing the mapping between the first logical block address LBA10 indicating the journal area JA1 of the first disk DISK1 and the first physical block address LBA10 at the same time (step S330), as illustrated in FIG. 9. An arrow and an X mark ③' in FIG. 9 may correspond to step S330 in FIG. 7.

In some example embodiments, the address mapping release operation and the address remapping operation in step S330 may be substantially simultaneously or concurrently performed based on a move command that is received from the host device 200 or is internally generated by the storage device 300.

In some example embodiments, when the second write operation is performed as described with reference to FIG. 7, step S400 in FIG. 1 may be omitted.

Figure 10:
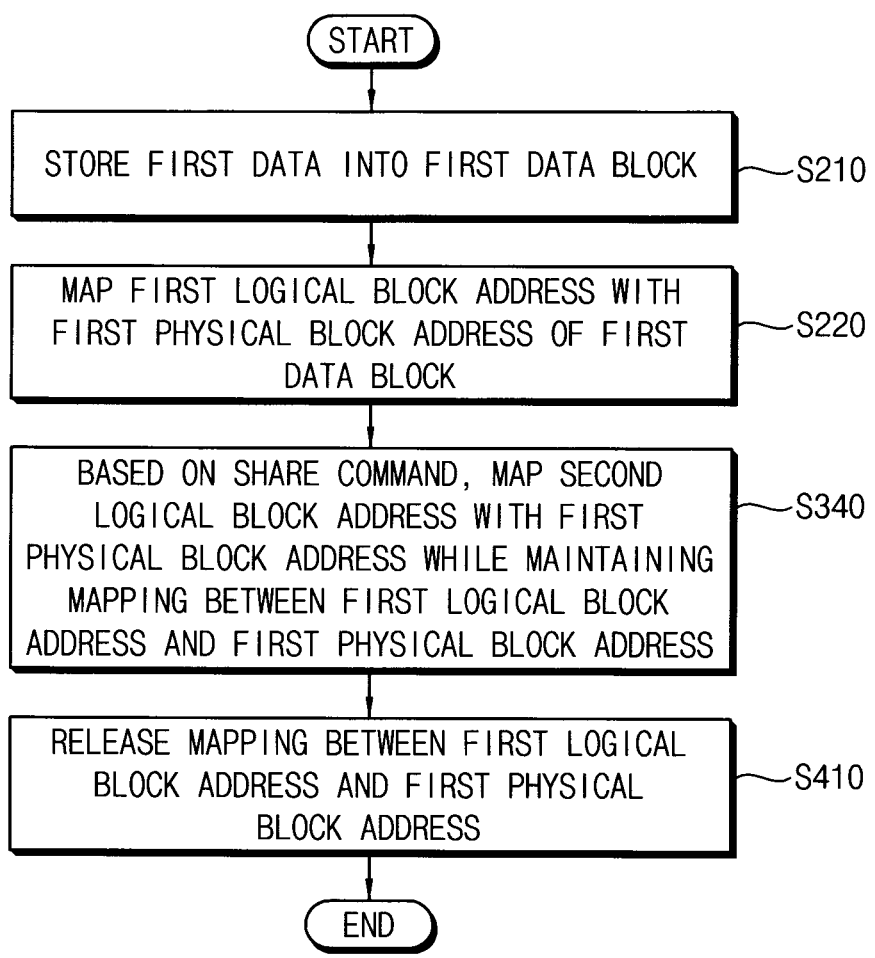
FIG. 10 is a flowchart illustrating still another example of performing a first write operation and a second write operation in the method of FIG. 1.
Figure 11:
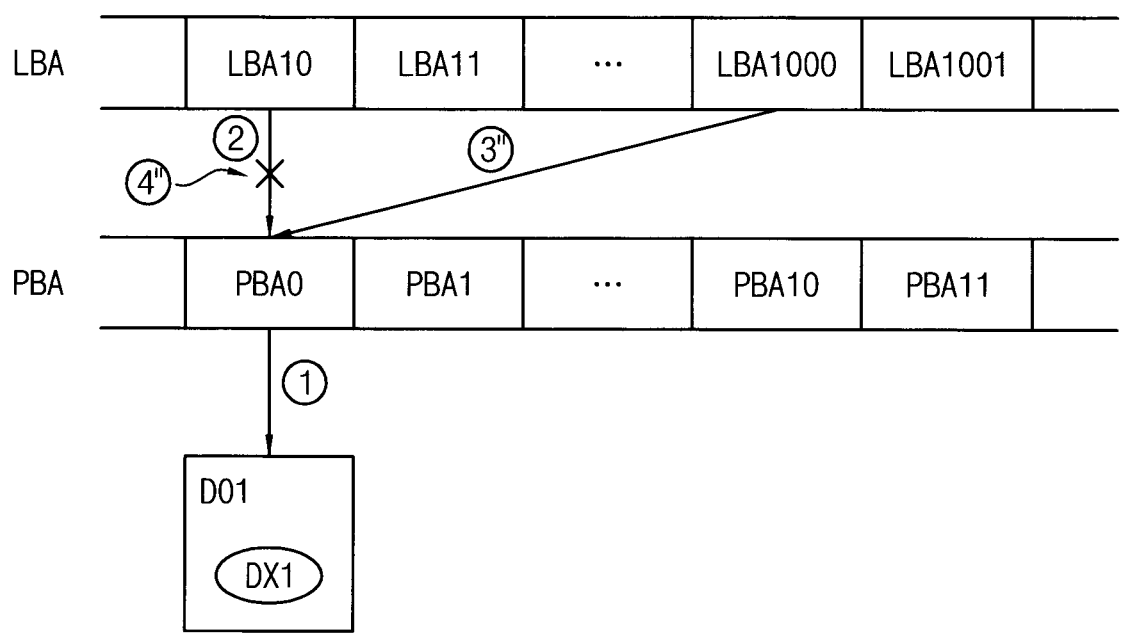
FIG. 11 is a diagram for describing the first write operation and the second write operation in FIG. 10.

FIG. 10 is a flowchart illustrating still another example of performing a first write operation and a second write operation in the method of FIG. 1. FIG. 11 is a diagram for describing the first write operation and the second write operation in FIG. 10. The descriptions repeated with respect to FIGS. 4, 5A, 5B, 5C, 5D, 6 and 8 will be omitted.

Referring to FIGS. 1, 8, 10 and 11, the first write operation may be substantially the same as that described with reference to FIGS. 5A and 5B, and steps S210 and S220 in FIG. 10 may be substantially the same as steps S210 and S220 in FIG. 4, respectively. Arrows ① and ② in FIG. 11 may be substantially the same as the arrows ① and ② in FIG. 6, respectively.

After the first write operation is completed, the second write operation may be performed similarly to that described with reference to FIG. 8 (step S300). For example, the second logical block address LBA1000 indicating the data area DA1 of the first disk DISK1 may be mapped with the first physical block address LBA10 of the first data block D01 while maintaining the mapping between the first logical block address LBA10 indicating the journal area JA1 of the first disk DISK1 and the first physical block address LBA10 (step S340), as illustrated in FIG. 11. An arrow ③" in FIG. 11 may correspond to step S340 in FIG. 10.

In some example embodiments, the address duplication mapping operation in step S340 may be performed based on a share command that is received from the host device 200 or is internally generated by the storage device 300.

After the second write operation is completed, the target data DX1, DX2, DX3 and PX may be released (step S400), as described with reference to FIG. 5D. For example, the mapping between the first logical block address LBA10 and the first physical block address PBA0 may be released (step S410), as illustrated in FIG. 11. An X mark ④" in FIG. 11 may correspond to step S410 in FIG. 10, and step S410 in FIG. 10 may be substantially the same as step S410 in FIG. 4.

Unlike an example of FIG. 7, the address mapping release operation may be performed after the address duplication mapping operation in an example of FIG. 10, and thus a power failure and/or a disk failure may be more efficiently handled or coped with.

In examples of FIGS. 7 and 10, the target data DX1, DX2, DX3 and PX may be received once from the external host memory 220, the target data DX1, DX2, DX3 and PX may be physically written once into the target disks DISK1~DISK4, and thus the data write cost may be reduced. In addition, the journal areas JA1~JA4 and the data areas DA1~DA4 of the target disks DISK1~DISK4 may be logically distinguished from each other, but may not be physically distinguished from each other.

Figure 12:
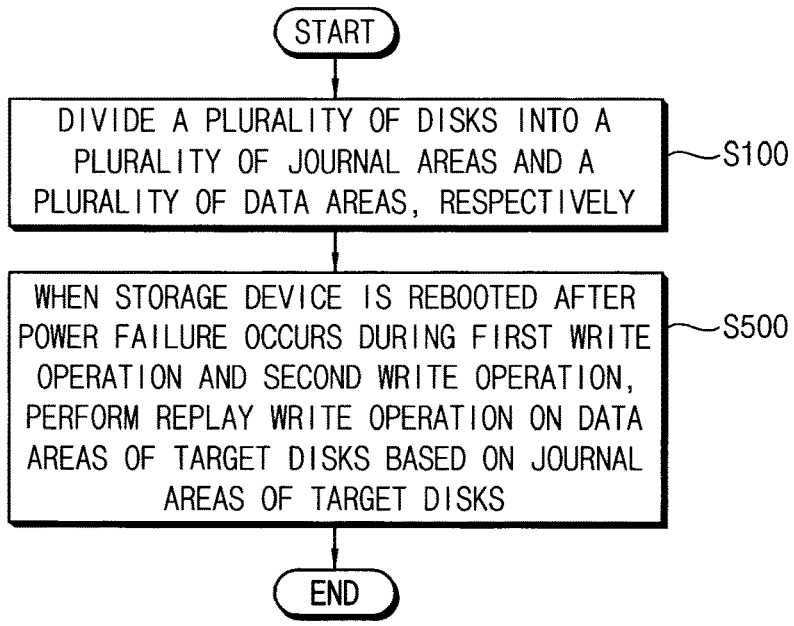
FIG. 12 is a flowchart illustrating a method of operating a storage device according to example embodiments.

FIG. 12 is a flowchart illustrating a method of operating a storage device according to example embodiments. The descriptions repeated with respect to FIG. 1 will be omitted.

Referring to FIG. 12, in a method of operating a storage device according to example embodiments, step S100 in FIG. 12 may be substantially the same as step S100 in FIG. 1.

When the storage device is rebooted after a power failure occurs on the storage device, a replay write operation is performed on the data areas of the target disks based on the journal areas of the target disks (step S500). In other words, inconsistency of the file system due to the power failure may be prevented and consistency of the file system may be maintained using the journal areas of the target disks.

In some example embodiments, the replay write operation may be performed when the storage device is rebooted after the power failure occurs during at least one of the first write operation and the second write operation. In other words, although not illustrated in FIG. 12, at least one of steps S200 and S300 in FIG. 1 may be included between steps S100 and S500 in FIG. 12.

Figure 13:
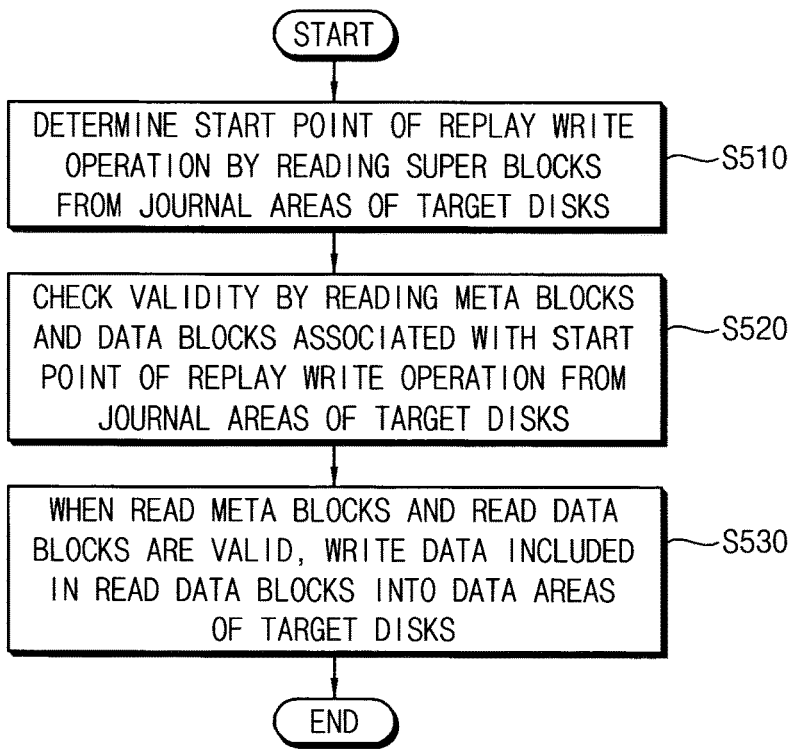
FIG. 13 is a flowchart illustrating an example of performing a replay write operation in the method of FIG. 12.
Figure 14A:
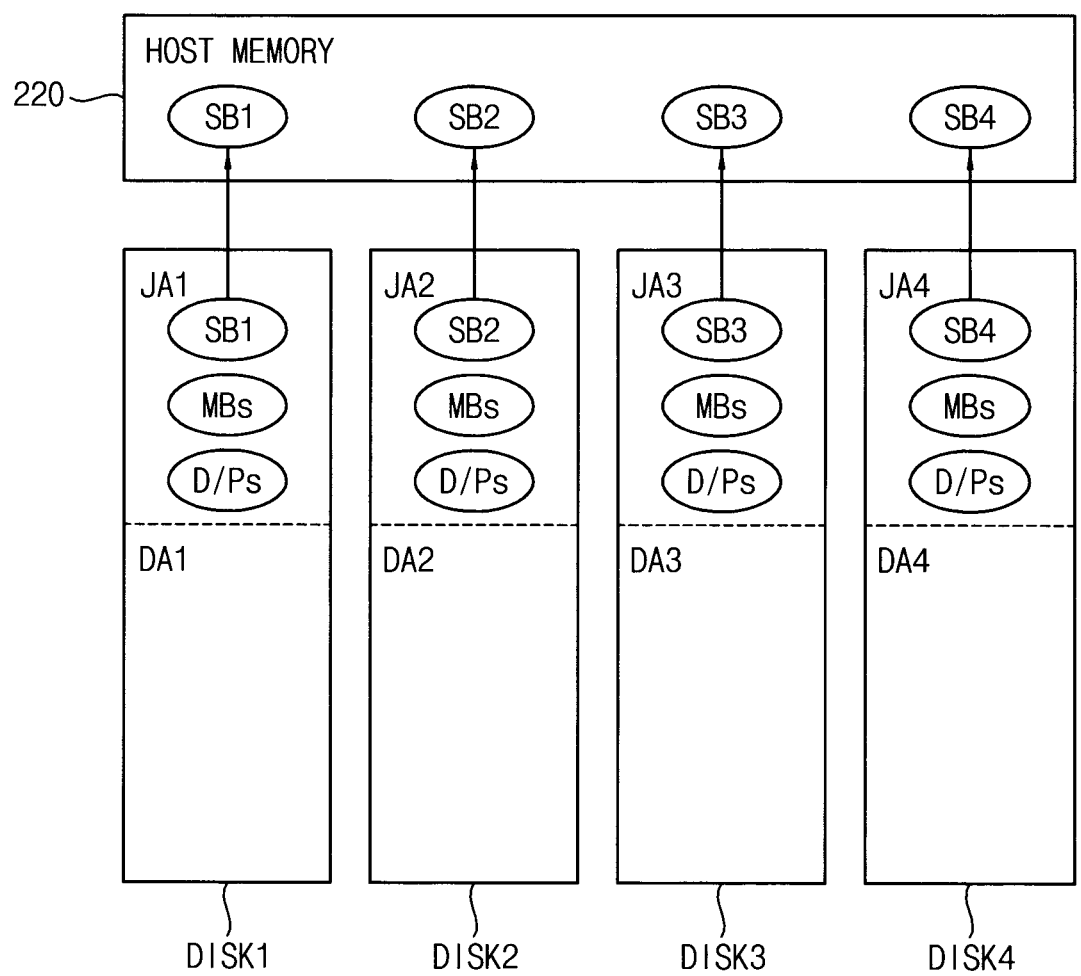
FIGS. 14A, 14B, 14C and 15 are diagrams for describing the replay write operation in FIG. 13.

FIG. 13 is a flowchart illustrating an example of performing a replay write operation in the method of FIG. 12. FIGS. 14A, 14B, 14C and 15 are diagrams for describing the replay write operation in FIG. 13. In FIG. 14A and following figures, reference numerals denoting a super block, a meta block and a data block may also be used to represent information and/or data stored in the super block, the meta block and the data block, respectively.

Referring to FIGS. 3, 12, 13, 14A, 14B, 14C and 15, when performing the replay write operation, a start point of the replay write operation may be determined by reading the super blocks SB1~SB4 from the journal areas JA1~JA4 of the target disks DISK1~DISK4 immediately after the storage system 100 is rebooted after the power failure (step S510).

For example, the read super blocks SB1~SB4 may be transmitted to the host memory 220 external to the storage device 300, as illustrated in FIG. 14A. The host device 200 may determine the start point of the replay write operation based on the initial transaction information included in the super blocks SB1~SB4. To determine the start point of the replay write operation, the initial transaction information included in the super blocks SB1~SB4 may be shared by the target disks included in the same array.

In some example embodiments, when the ID information of the initial transactions included in all of the super blocks SB1~SB4 are substantially the same as each other, a transaction corresponding to the same ID may be selected as the start point of the replay write operation.

In other example embodiments, when the ID information of the initial transactions included in the super blocks SB1~SB4 are different from each other, a transaction corresponding to the smallest ID may be selected as the start point of the replay write operation. For example, when the ID information of the initial transactions included in the super blocks SB1, SB3 and SB4 are "1" and the ID information of the initial transaction included in the super block SB2 is "0," it may be determined that the transaction TRS0 corresponding to the smallest ID has not yet been released in the journal areas JA1~JA4, and thus the transaction TRS0 may be selected as the start point of the replay write operation (e.g., the replay write operation may be started from the transaction TRS0).

Validity may be checked by reading meta blocks and data blocks associated with the start point of the replay write operation from the journal areas JA1~JA4 of the target disks DISK1~DISK4 (step S520).

Figure 14B:
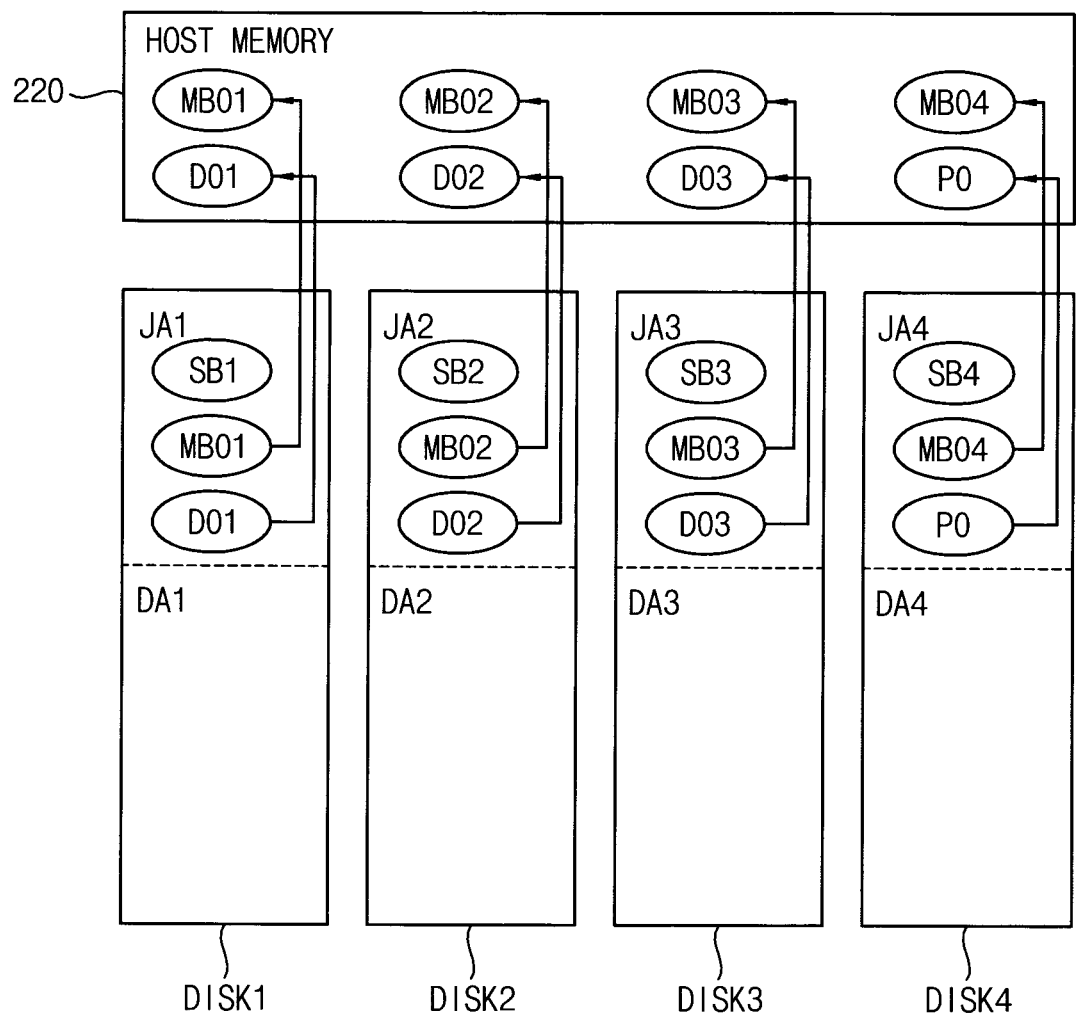

For example, when the transaction TRS0 is selected as the start point of the replay write operation as described above, the meta blocks MB01~MB04 and the data blocks D01, D02, D03 and P0 for the transaction TRS0 among meta blocks MBs and data blocks D/Ps may be read out and transmitted to the external host memory 220, as illustrated in FIG. 14B. Although FIG. 14B illustrates that only some data blocks D01, D02, D03 and P0 of the transaction TRS0 are read out, actually all the data blocks D01, D02, D03, P0, D11, D12, P1, D13, D21, D22, D23, P2, P3, D31, D32 and D33 of the transaction TRS0 may be read out.

In some example embodiments, an operation of reading information of all the data blocks D01~D33 in the transaction TRS0 and comparing it with the checksum information of the meta blocks MB01-MB04 may be performed for the validity check.

When it is checked in step S520 that the read meta blocks and the read data blocks are valid, data included in the read data blocks may be written into the data areas DA1~DA4 of the target disks DISK1~DISK4 (step S530).

Figure 14C:
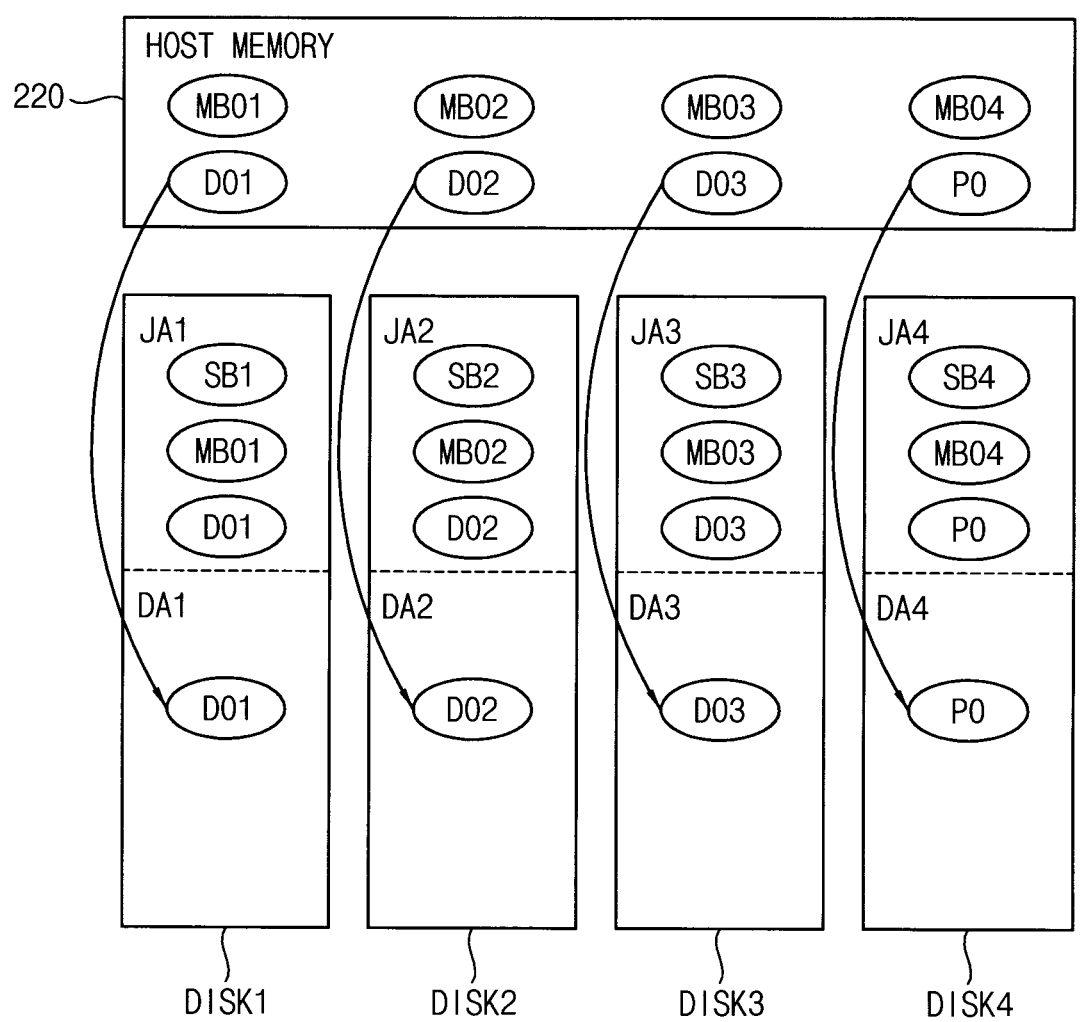

In some example embodiments, the data blocks D01, D02, D03 and P0 may be received from the external host memory 220 and written into the data areas DA1~DA4, as illustrated in FIG. 14C. In other words, an operation of FIG. 14C may be similar to an operation of FIG. 5C.

Figure 15:
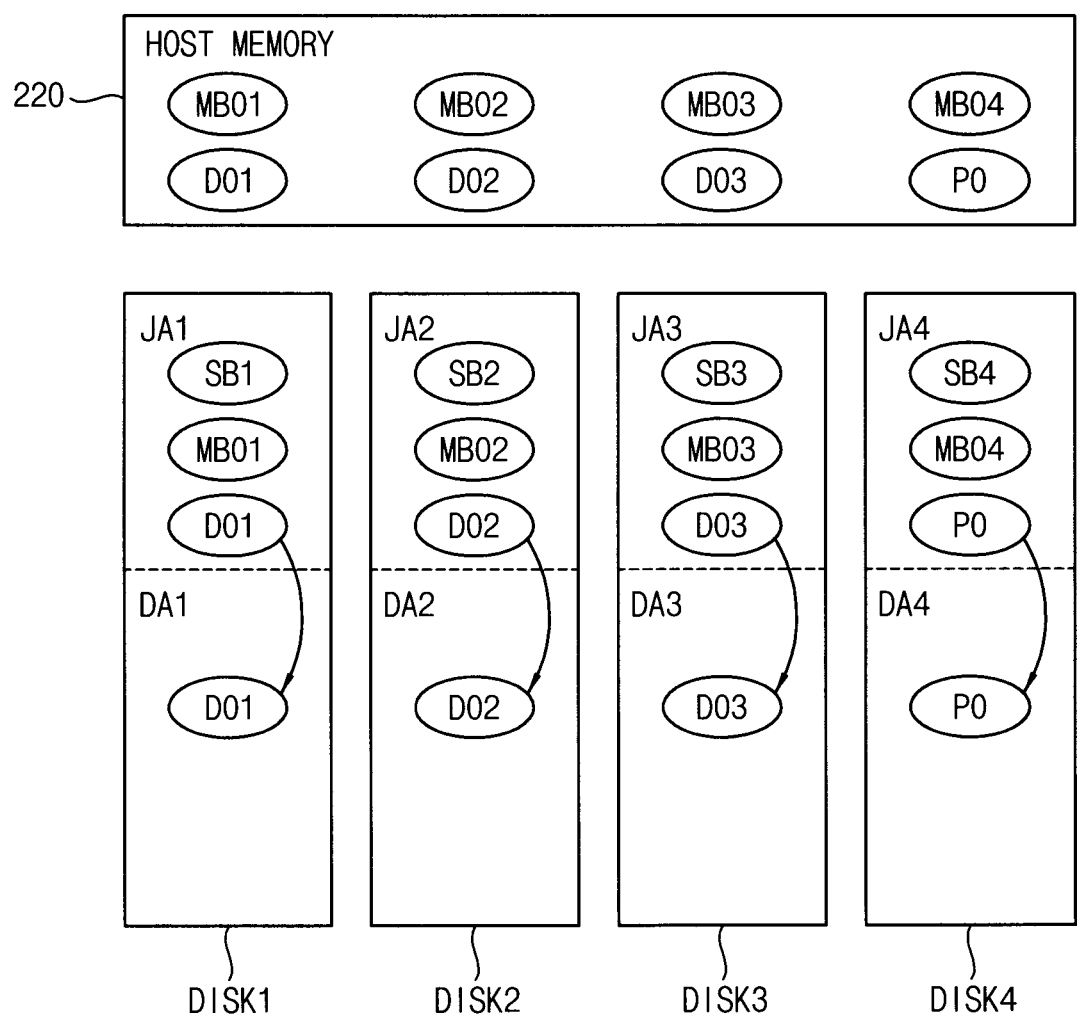

In other example embodiments, the data blocks D01, D02, D03 and P0 may be internally provided in the storage device 300, not from the external host memory 220, and written into the data areas DA1~DA4, as illustrated in FIG. 15. In other words, an operation of FIG. 15 may be similar to an operation of FIG. 8 and may be internally performed based on one of the move command and share command described with reference to FIGS. 9 and 11.

When the read meta blocks and the read data blocks are invalid, steps S520 and S530 may be repeated for a next or subsequent transaction (e.g., the transaction TRS1). In this manner, all valid transactions in the journal areas JA1~JA4 may be written into the data areas DA1~DA4.

Figure 16:
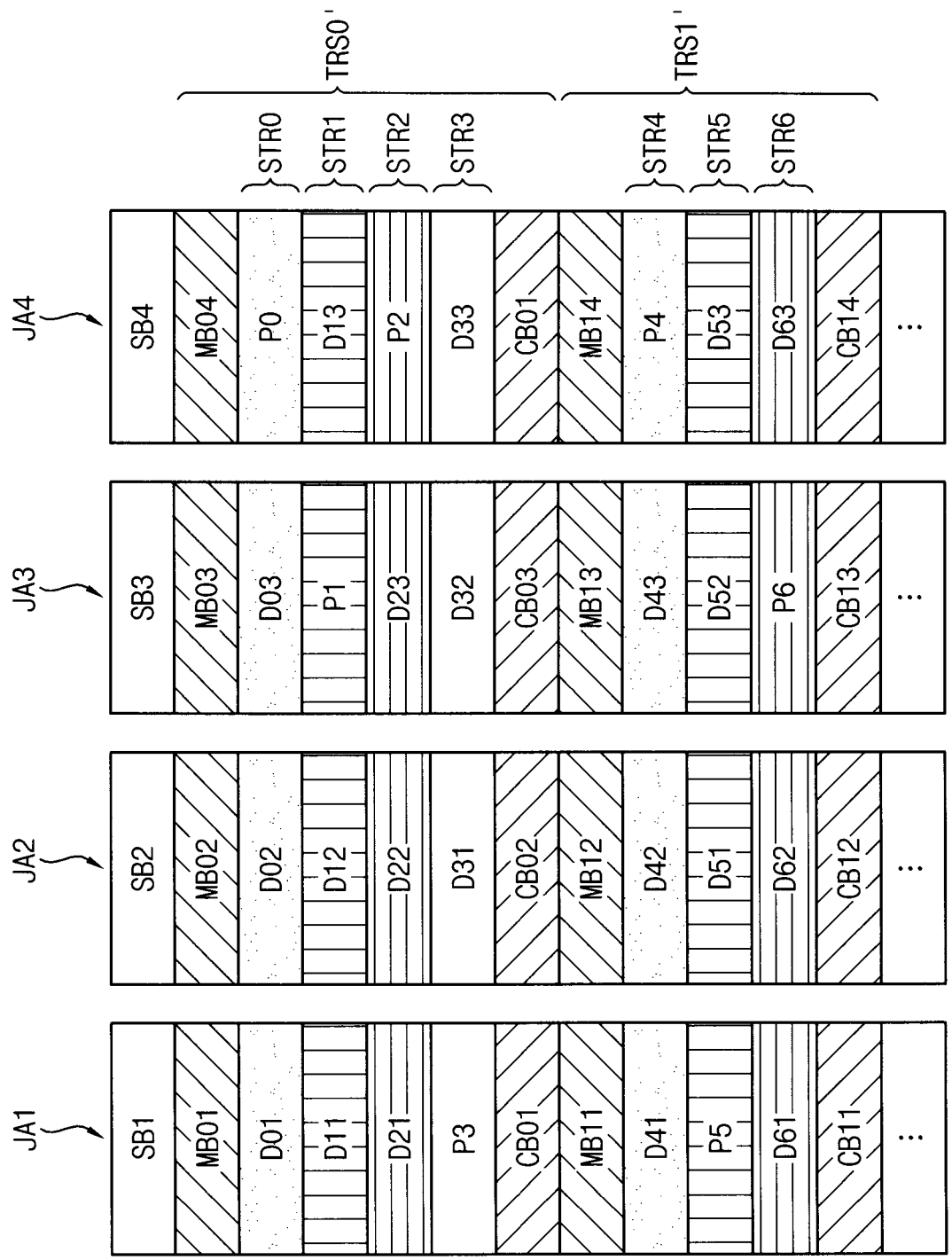
FIG. 16 is a diagram illustrating another example of a journal area included in a storage device according to example embodiments.

FIG. 16 is a diagram illustrating another example of a journal area included in a storage device according to example embodiments. The descriptions repeated with respect to FIG. 3 will be omitted.

Referring to FIG. 16, the journal areas JA1~JA4 may include super blocks SB1~SB4, meta blocks MB01~MB14, data blocks D01~D63, and commit blocks CB01, CB02, CB03, CB04, CB11, CB12, CB13 and CB14. In an example of FIG. 16, the data blocks D01, D02, D03 and P0 may form the stripe STR0, the data blocks D11, D12, P1 and D13 may form the stripe STR1, the data blocks D21, D22, D23 and P2 may form the stripe STR2, the data blocks P3, D31, D32 and D33 may form the stripe STR3, the data blocks D41, D42, D43 and P4 may form the stripe STR4, the data blocks P5, D51, D52 and D53 may form the stripe STR5, and the data blocks D61, D62, P6 and D63 may form the stripe STR6. In addition, the stripes STR0, STR1, STR2 and STR3 may form the transaction TRS0', and the stripes STR4, STR5 and STR6 may form the transaction TRS1'.

An example of FIG. 16 may be substantially the same as an example of FIG. 3, except that an example of FIG. 16 further includes the commit blocks CB01~CB14.

The commit blocks CB01~CB14 may ensure that a write operation to the current transaction has been successfully completed. In other words, the commit blocks may be used to ensure that all data/parity blocks included in one transaction have been completely written into the journal areas JA1~JA4.

Since the commit block is a last block in one transaction, a location of the commit block in one transaction may be determined using the meta block. For example, the meta block may know the number of data/parity blocks by itself, and thus the location of the commit block may be obtained based on the number of data/parity blocks. Therefore, in the system reboot situation, it may be possible to check the location of the commit block by reading only the meta block, and the validity check may be performed without reading the data/parity blocks.

Figure 17:
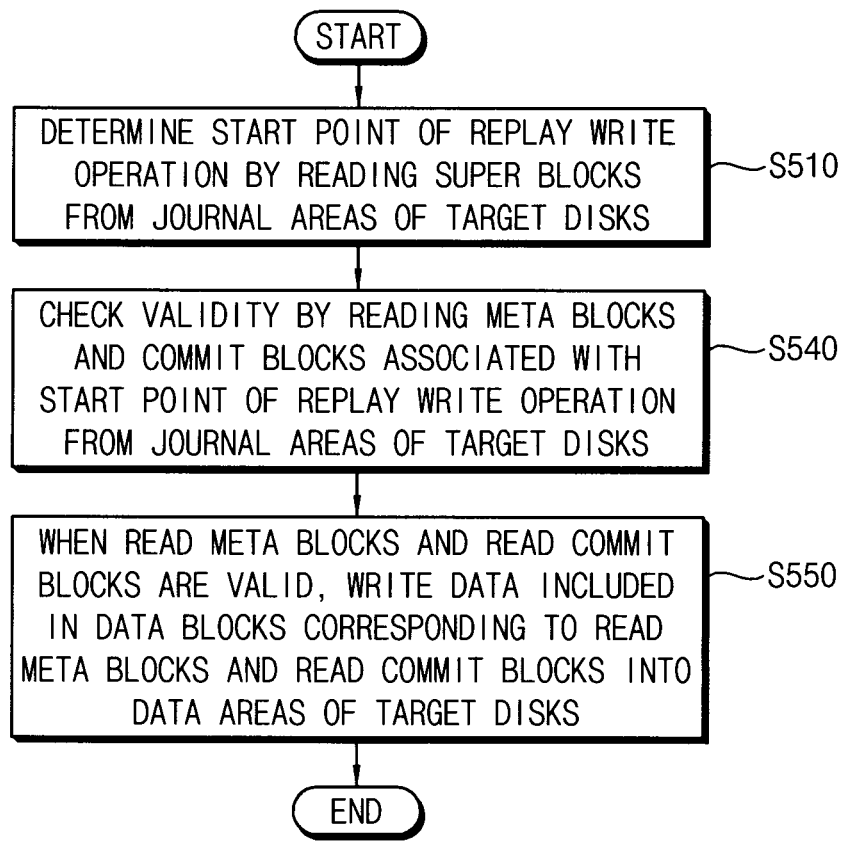
FIG. 17 is a flowchart illustrating another example of performing a replay write operation in the method of FIG. 12.
Figure 18A:
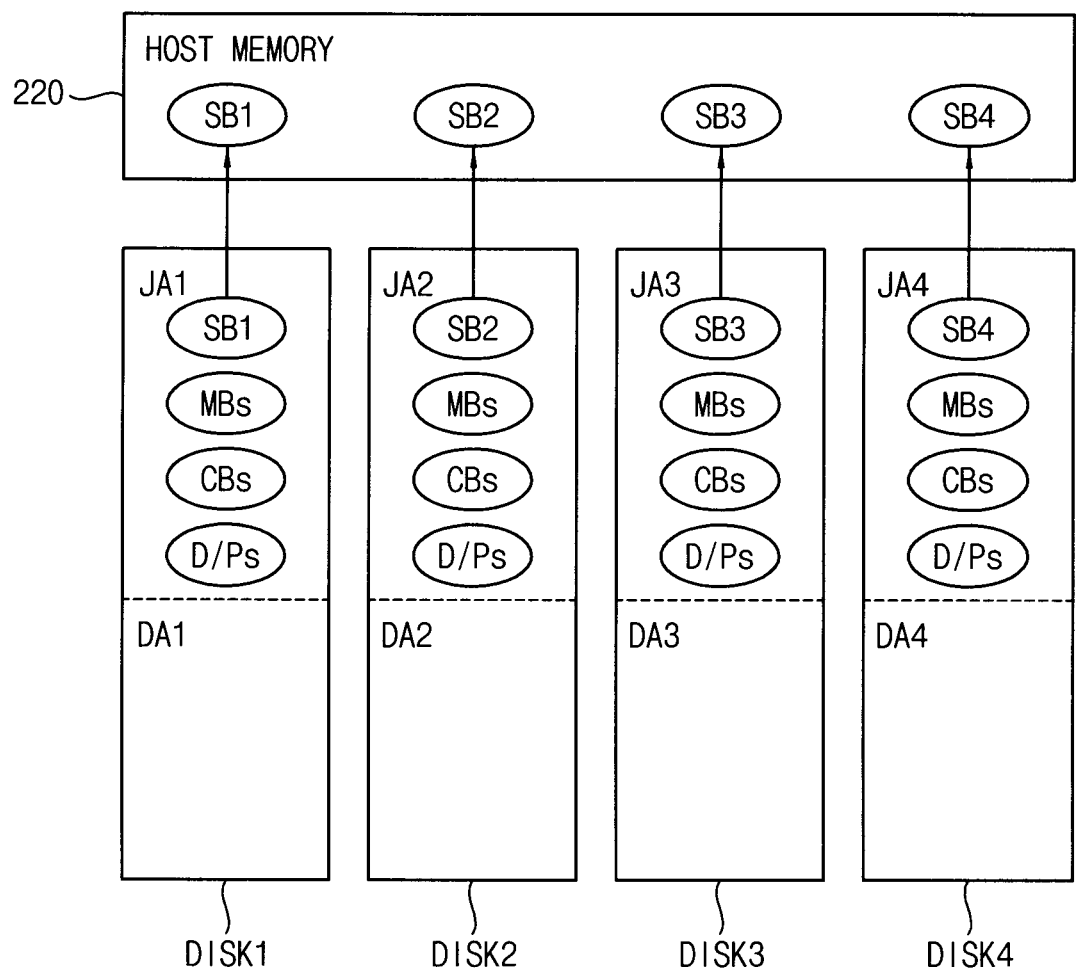
FIGS. 18A, 18B and 18C are diagrams for describing the replay write operation in FIG. 17.
Figure 18B:
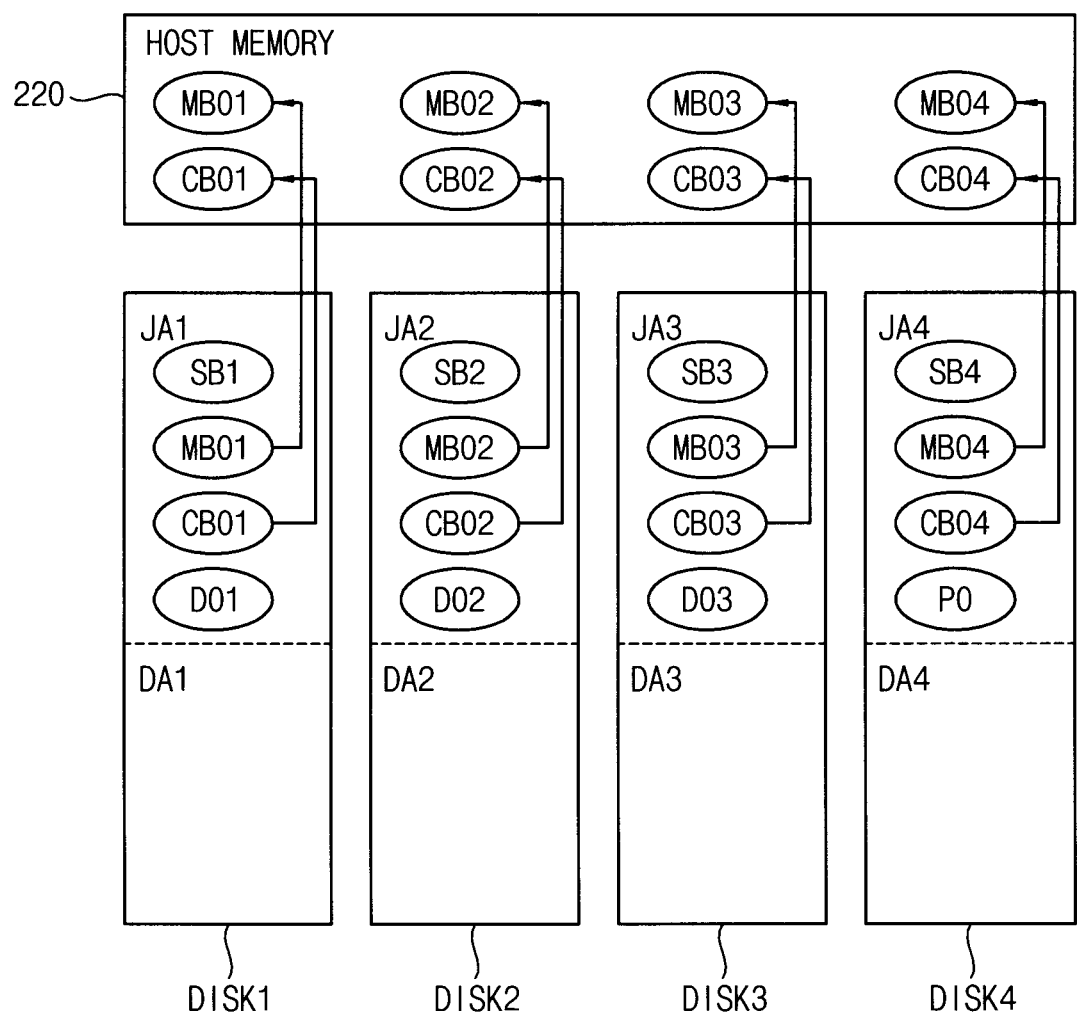
Figure 18C:
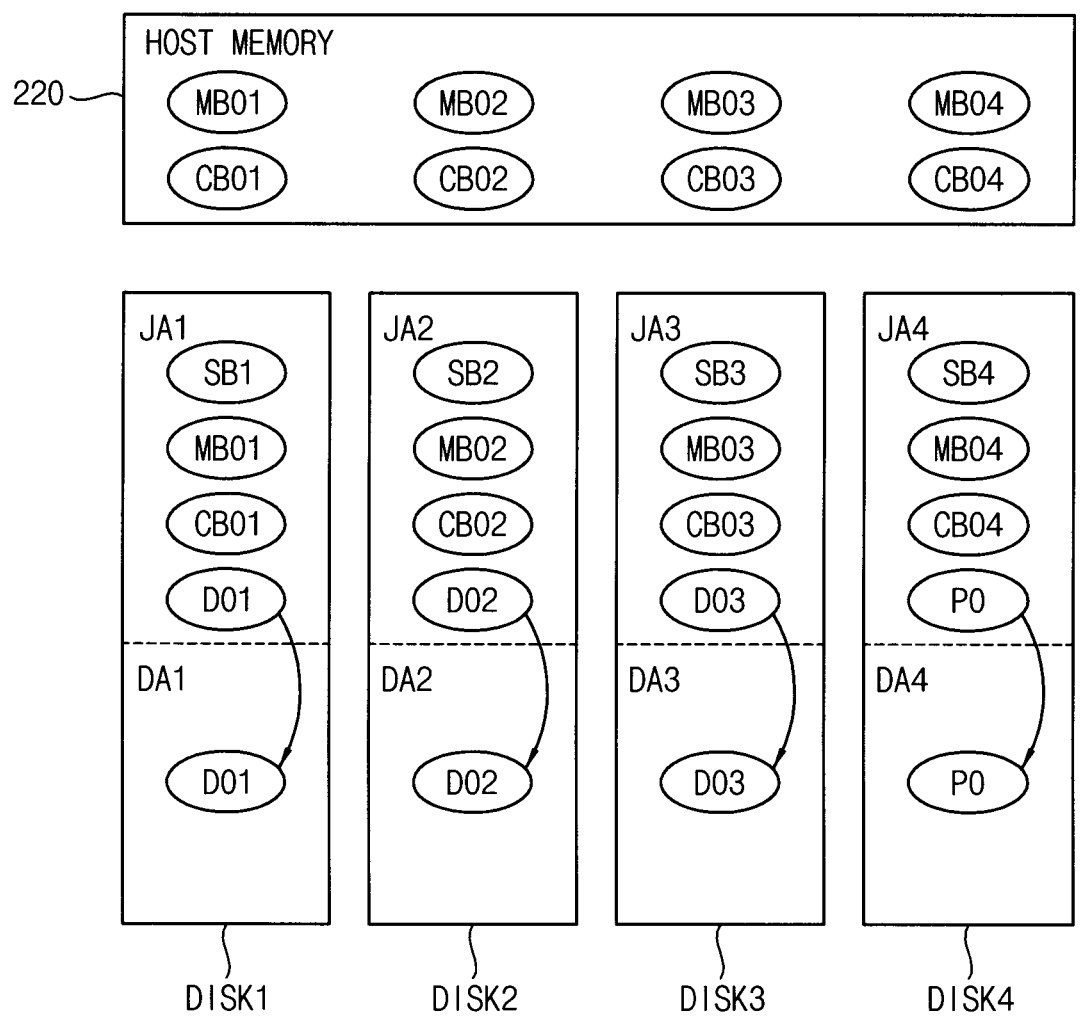

FIG. 17 is a flowchart illustrating another example of performing a replay write operation in the method of FIG. 12. FIGS. 18A, 18B and 18C are diagrams for describing the replay write operation in FIG. 17. The descriptions repeated with respect to FIGS. 13, 14A, 14B, 14C and 15 will be omitted.

Referring to FIGS. 12, 16, 17, 18A, 18B and 18C, when performing the replay write operation, step S510 in FIG. 17 may be substantially the same as step S510 in FIG. 13, and an operation of FIG. 18A may be substantially the same as an operation of FIG. 14A.

Validity may be checked by reading meta blocks and commit blocks associated with the start point of the replay write operation from the journal areas JA1~JA4 of the target disks DISK1~DISK4 (step S540).

For example, when the transaction TRS0 is selected as the start point of the replay write operation, the meta blocks MB01~MB04 and the commit blocks CB01~CB04 for the transaction TRS0 among meta blocks MBs and commit blocks CBs may be read out and transmitted to the external host memory 220, as illustrated in FIG. 18B.

When it is checked in step S540 that the read meta blocks and the read commit blocks are valid, data included in data blocks corresponding to the read meta blocks and the read commit blocks may be written into the data areas DA1~DA4 of the target disks DISK1~DISK4 (step S550).

For example, the data blocks D01, D02, D03 and P0 may be internally provided in the storage device 300 and written into the data areas DA1~DA4, as illustrated in FIG. 18C. An operation of FIG. 18 may be substantially the same as an operation of FIG. 15 and may be internally performed based on one of the move command and share command.

In an example of FIG. 17, the data blocks D01, D02, D03 and P0 are not transmitted to the external host memory 220, and thus the data blocks D01, D02, D03 and P0 may not be received from the external host memory 220 and may not be written in the data areas DA1~DA4 as in an operation of FIG. 14C. In addition, the validity may be relatively simply checked by using the commit blocks CB01~CB04 instead of comparing the checksum information of all the data blocks in the transaction with the checksum information of the meta blocks. Thus, the reboot time may be reduced to have improved performance.

Figure 19:
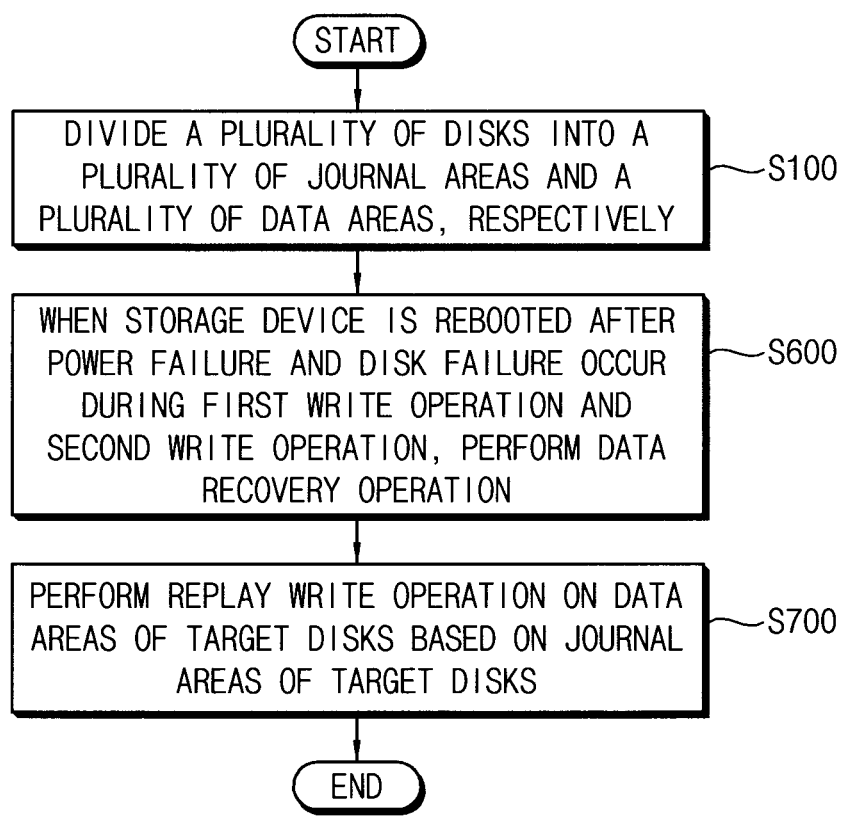
FIG. 19 is a flowchart illustrating a method of operating a storage device according to example embodiments.

FIG. 19 is a flowchart illustrating a method of operating a storage device according to example embodiments. The descriptions repeated with respect to FIGS. 1 and 12 will be omitted.

Referring to FIG. 19, in a method of operating a storage device according to example embodiments, step S100 in FIG. 19 may be substantially the same as step S100 in FIG. 1.

When the storage device is rebooted after a power failure occurs on the storage device and a disk failure occurs on at least one of the target disks, a data recovery operation is performed on a failed disk (step S600).

After the data recovery operation is performed, a replay write operation is performed on the data areas of the target disks based on the journal areas of the target disks (step S700). Step S700 in FIG. 19 may be similar to step S500 in FIG. 12.

Although not illustrated in FIG. 19, at least one of steps S200 and S300 in FIG. 1 may be included between steps S100 and S600 in FIG. 19.

Figure 20:
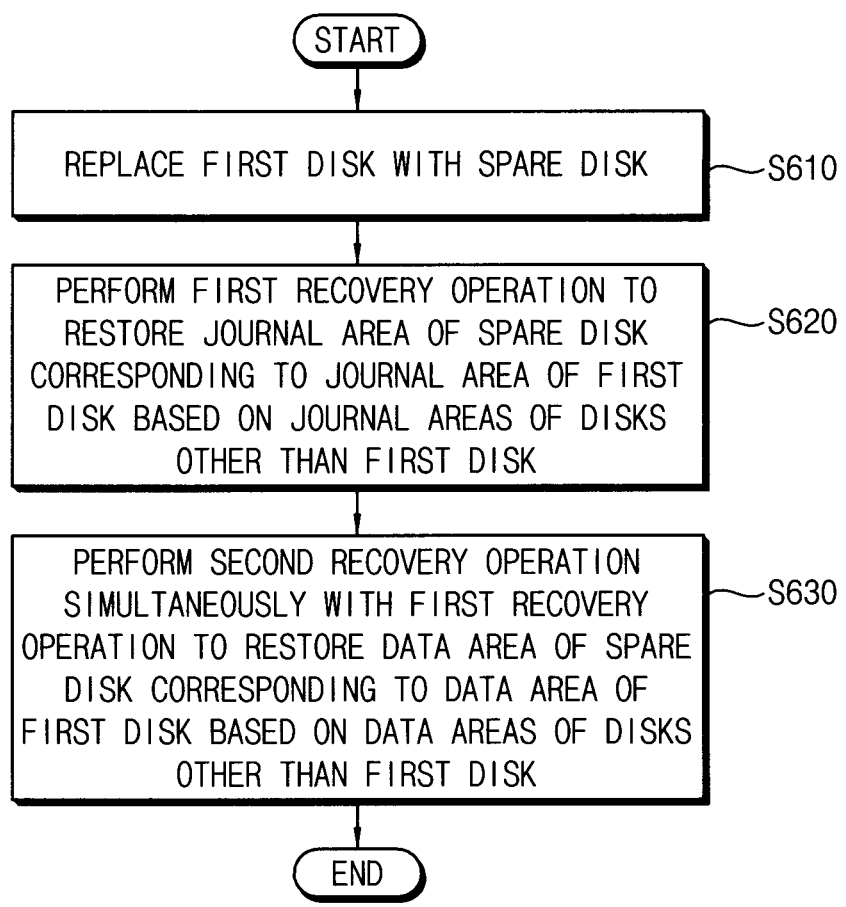
FIG. 20 is a flowchart illustrating an example of performing a data recovery operation in the method of FIG. 19.
Figure 21A:
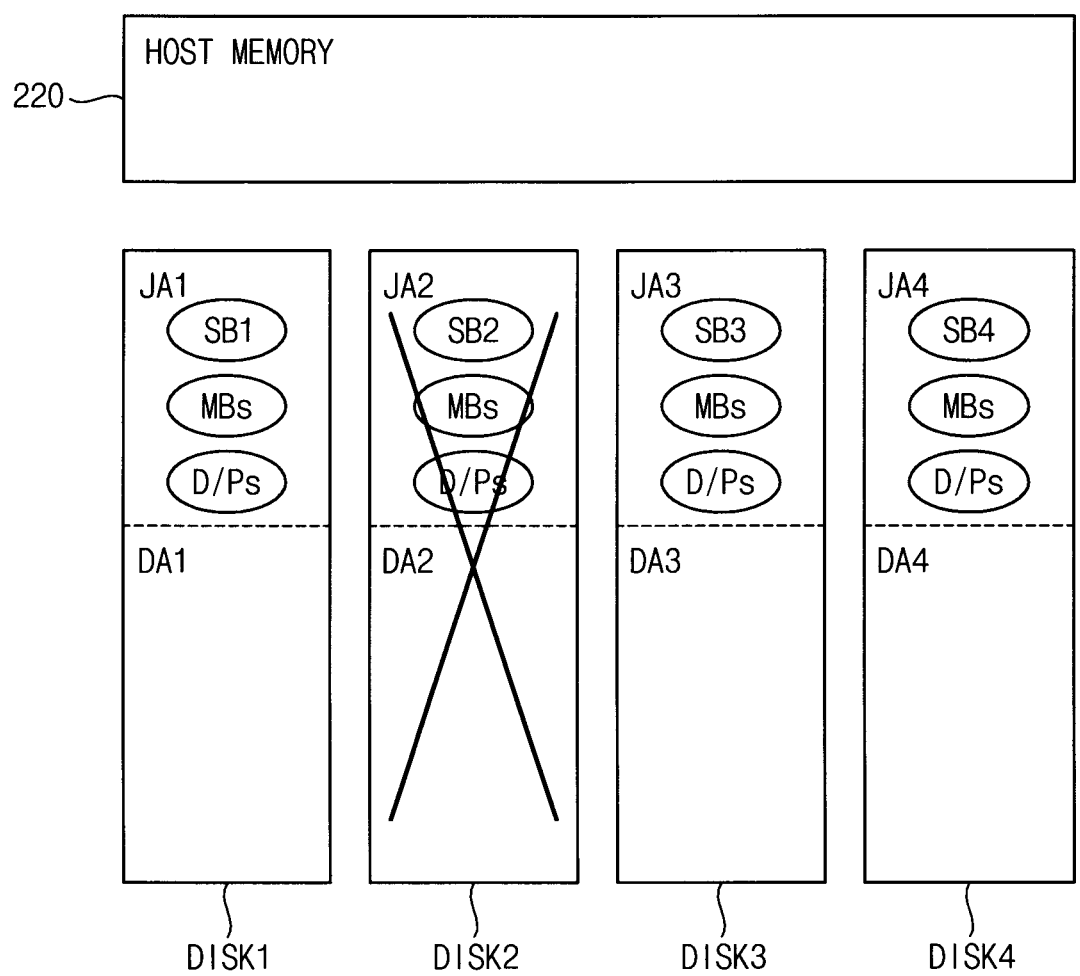
FIGS. 21A, 21B and 21C are diagrams for describing the data recovery operation in FIG. 20.
Figure 21B:
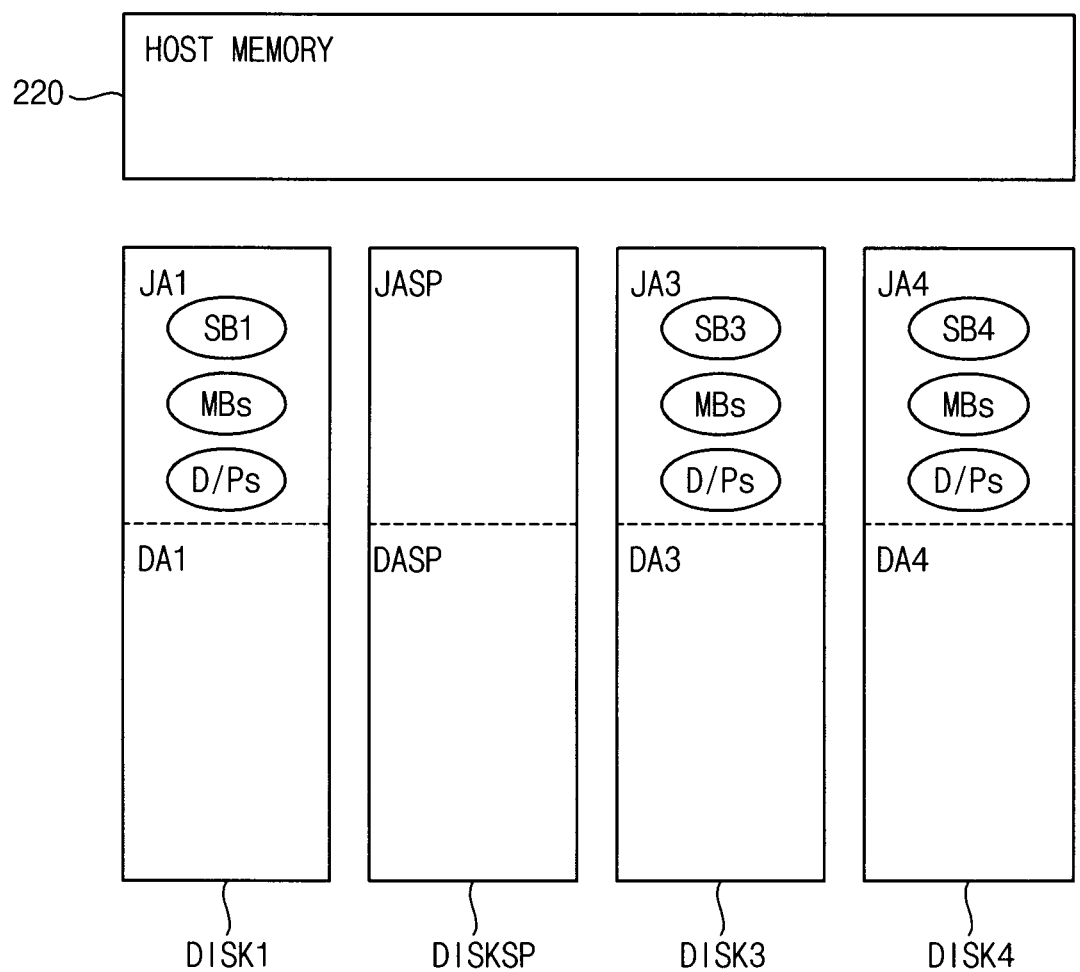
Figure 21C:
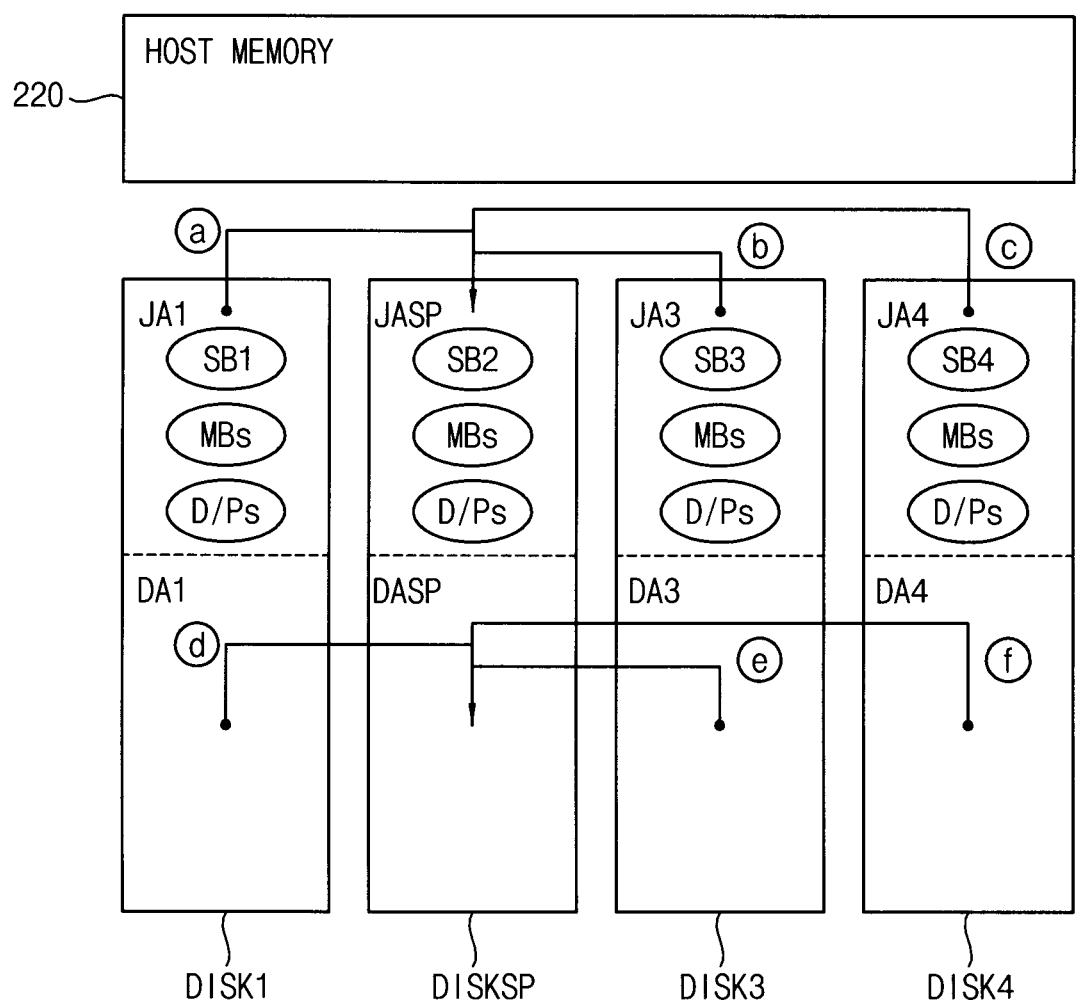

FIG. 20 is a flowchart illustrating an example of performing a data recovery operation in the method of FIG. 19. FIGS. 21A, 21B and 21C are diagrams for describing the data recovery operation in FIG. 20.

Referring to FIGS. 3, 19, 20, 21A, 21B and 21C, when performing the data recovery operation, the failed disk may be replaced with a spare disk (step S610).

For example, a disk failure may occur on the second disk DISK2 among the target disks DISK1~DISK4, as illustrated in FIG. 21A (e.g., an X mark in FIG. 21A). In this example, the second disk DISK2 may be replaced with a spare disk DISKSP, as illustrated in FIG. 21B.

The spare disk DISKSP may be one of the plurality of disks 310~330 included in the storage device 300, may not be used during a normal operation, and may be used to replace the failed disk in an event of the disk failure. As with the normal disks DISK1~DISK4, the spare disk DISKSP may also be divided into a journal area JASP and a disk area DASP.

As the disk failure occurs, all of the super block SB2, the meta blocks MBs and the data blocks D/Ps in the journal area JA2 and the data blocks of the data area DA2, which are data in the second disk DISK2, may be damaged. The data recovery operation may be performed using data in the other undamaged disks DISK1, DISK3 and DISK4 in the same array.

For example, a first recovery operation may be performed to restore the journal area JASP of the spare disk DISKSP corresponding to the journal area JA2 of the failed disk DISK2 based on the journal areas JA1, JA3 and JA4 of the disks DISK1, DISK3 and DISK4 among the target disks other than the failed disk DISK2 (step S620). In addition, a second recovery operation may be performed to restore the data area DASP of the spare disk DISKSP corresponding to the data area DA2 of the failed disk DISK2 based on the data areas DA1, DA3 and DA4 of the disks DISK1, DISK3 and DISK4 among the target disks other than the failed disk DISK2 (step S630).

In an example of FIG. 20, the first recovery operation and the second recovery operation may be substantially simultaneously or concurrently performed, as illustrated in FIG. 21C. Arrows ⓐ, ⓑ and ⓒ in FIG. 21C may correspond to the first recovery operation, and arrows ⓓ, ⓔ and ⓕ in FIG. 21C may correspond to the second recovery operation. The first and second recovery operations may be performed based on at least one of normal or general recovery algorithms. As a result of the first and second recovery operations, data substantially the same as that stored in the disk DISK2 may be restored.

After the data recovery operation is completed, the replay write operation may be performed in the manner described with reference to FIGS. 13 through 18.

Figure 22:
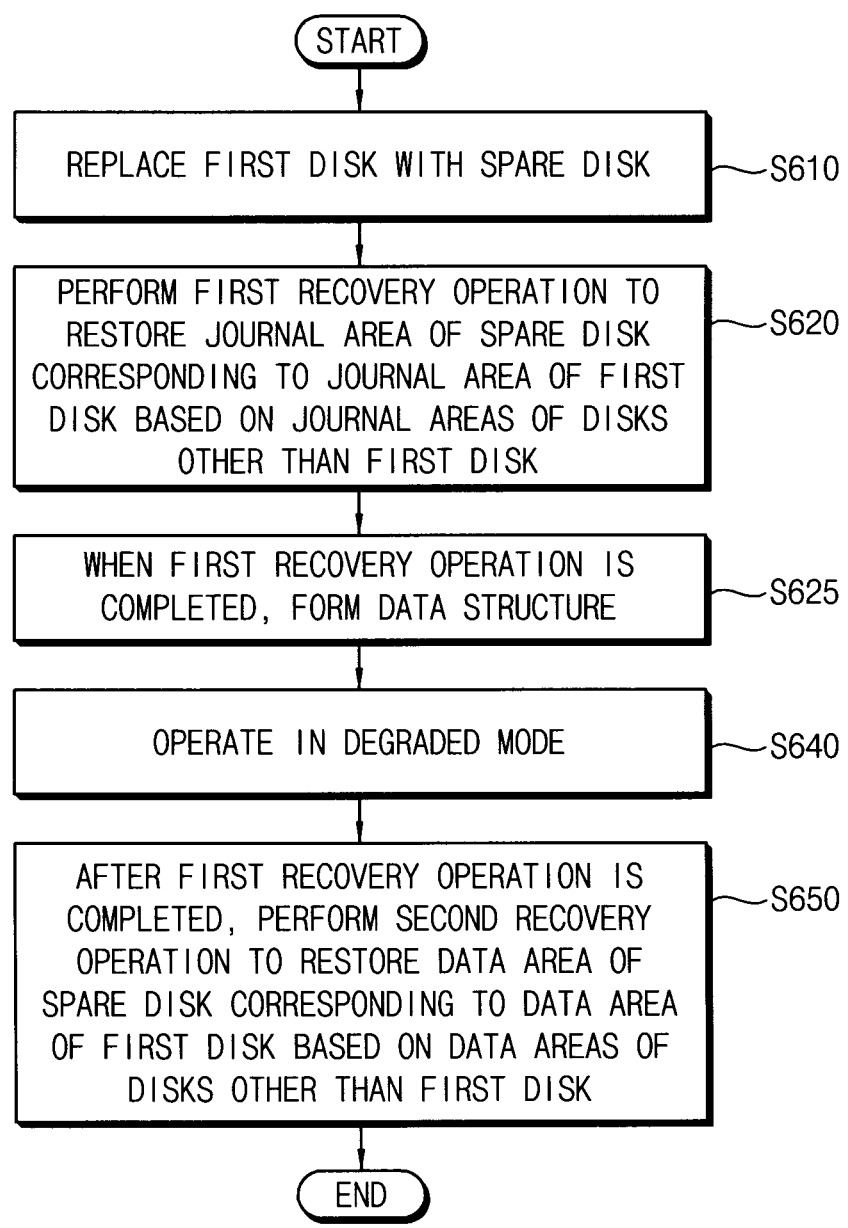
FIG. 22 is a flowchart illustrating another example of performing a data recovery operation in the method of FIG. 19.
Figure 23A:
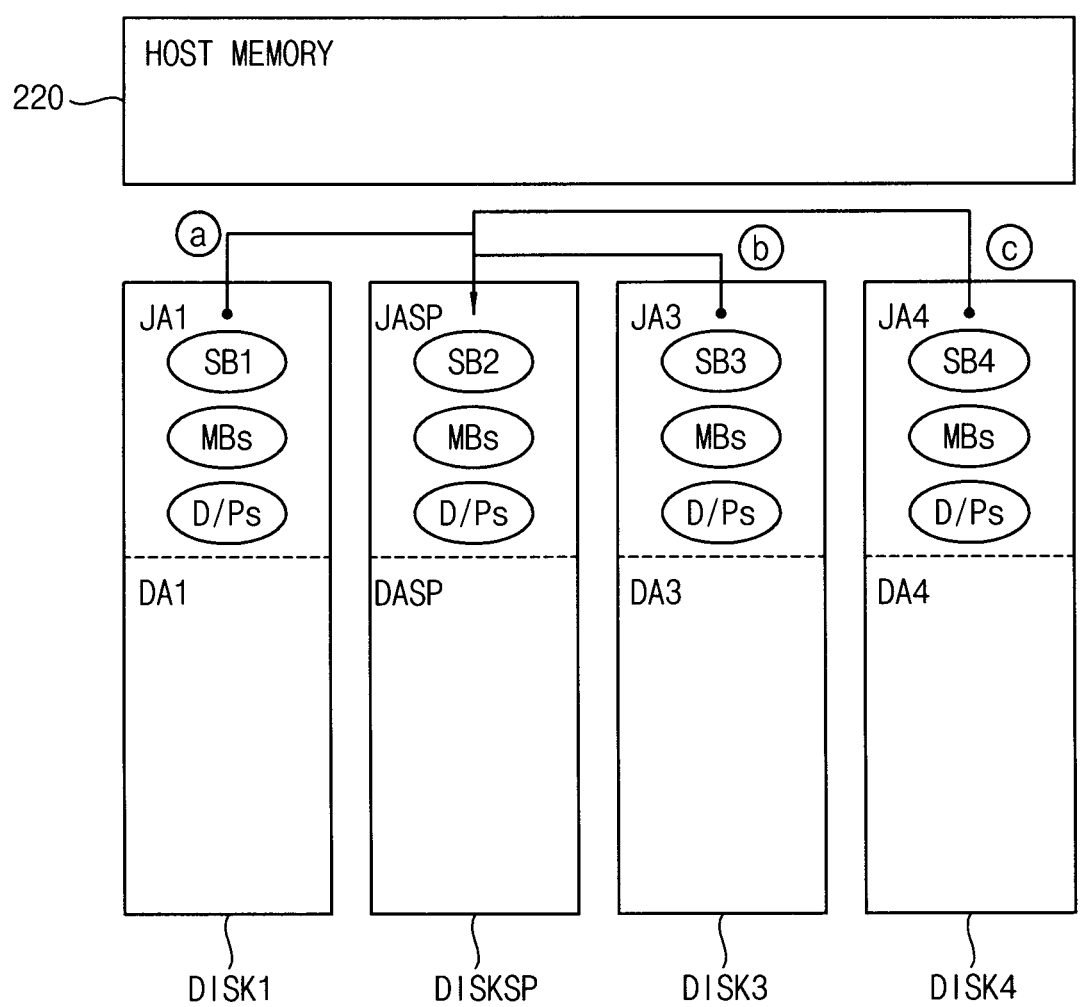
FIGS. 23A, 23B and 23C are diagrams for describing the data recovery operation in FIG. 22.
Figure 23B:
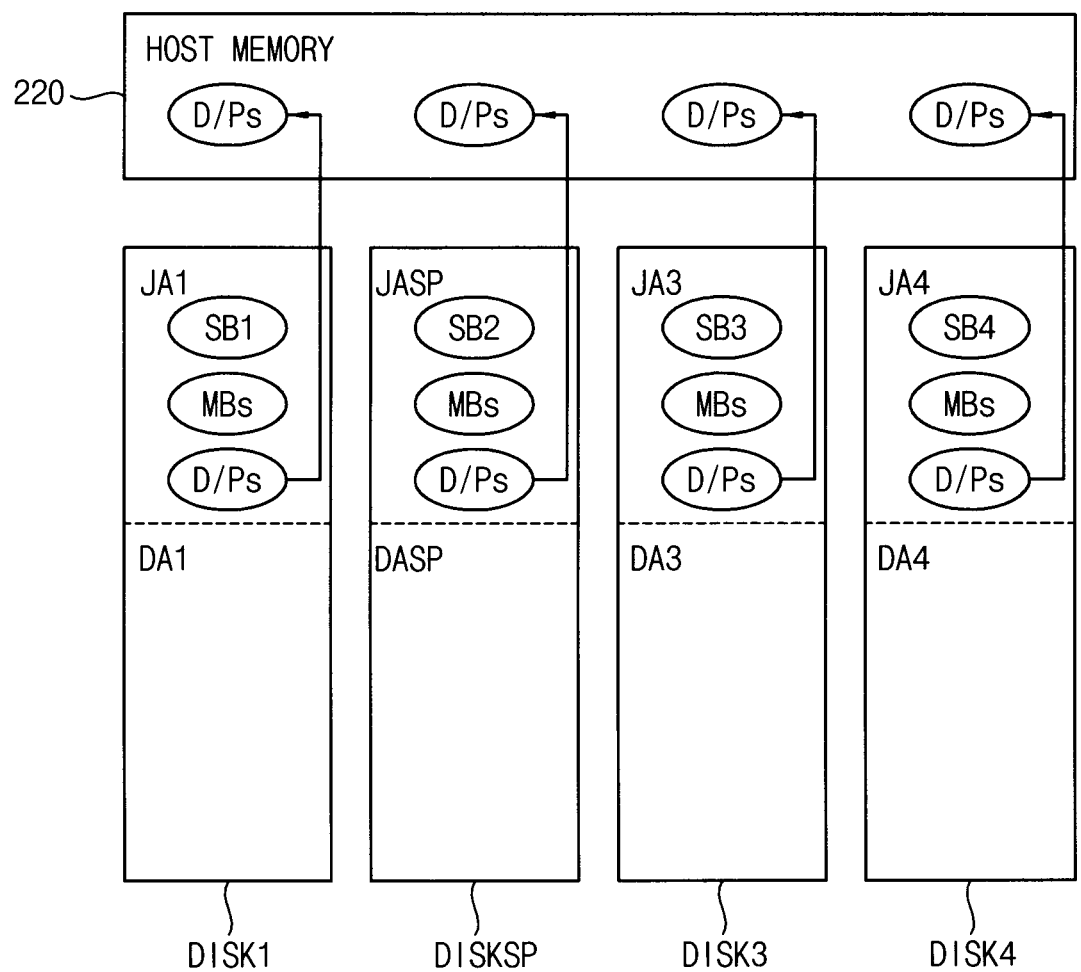
Figure 23C:
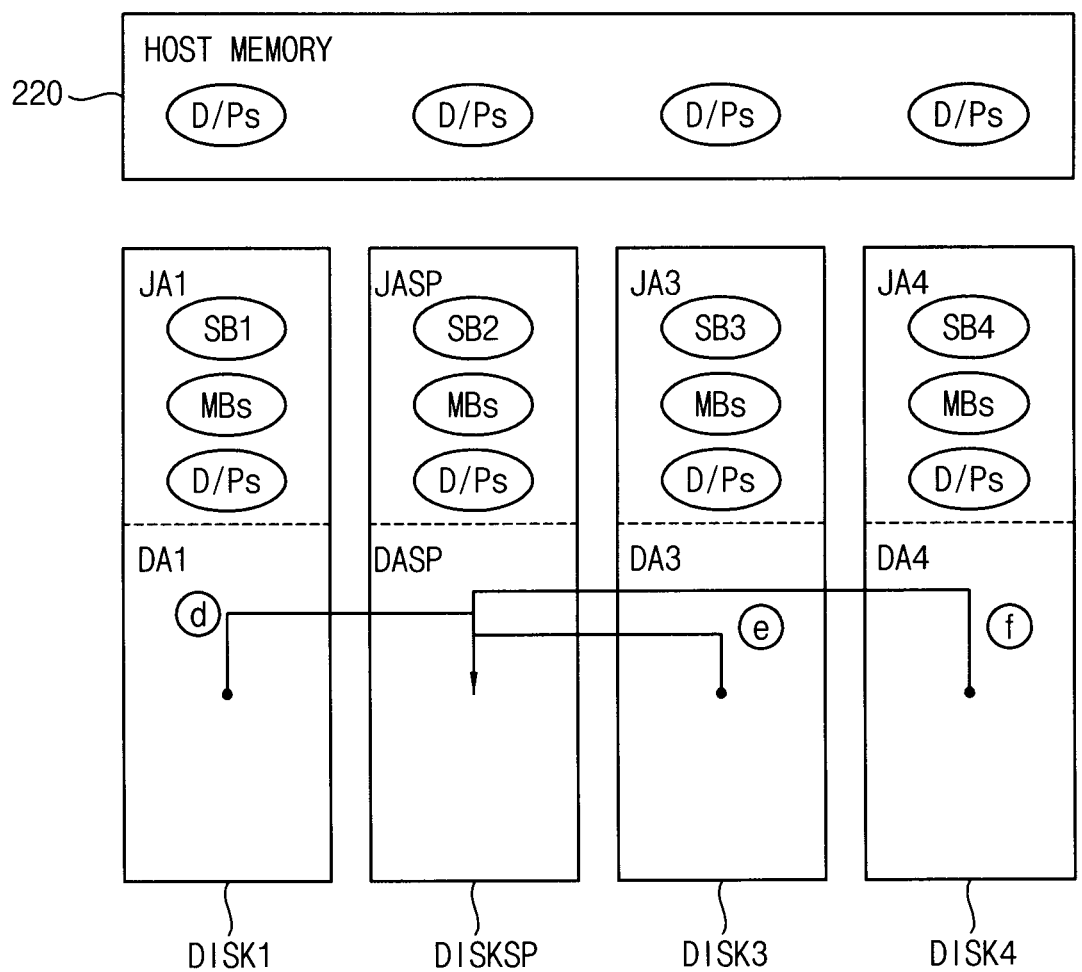

FIG. 22 is a flowchart illustrating another example of performing a data recovery operation in the method of FIG. 19. FIGS. 23A, 23B and 23C are diagrams for describing the data recovery operation in FIG. 22. The descriptions repeated with respect to FIGS. 20, 21A, 21B and 21C will be omitted.

Referring to FIGS. 3, 19, 22, 23A, 23B and 23C, when performing the data recovery operation, step S610 in FIG. 22 may be substantially the same as step S610 in FIG. 20. For example, as illustrated in FIGS. 21A and 21B, the failed disk DISK2 may be replaced with the spare disk DISKSP.

As with an example of FIG. 20, the first and second recovery operations may be performed to restore the data in the failed disk DISK2. However, unlike an example of FIG. 20, the first recovery operation and the second recovery operation may be sequentially performed in an example of FIG. 22. In addition, the storage device 300 may operate in a degraded mode after the first recovery operation is completed and until the second recovery operation and the replay write operation are completed.

For example, only the first recovery operation may be performed first to restore the journal area JASP of the spare disk DISKSP (step S620), as illustrated in FIG. 23A. Step S620 in FIG. 22 may be substantially the same as step S620 in FIG. 20, and arrows ⓐ, ⓑ and ⓒ in FIG. 23A may be substantially the same as the arrows ⓐ, ⓑ and ⓒ in FIG. 21C. To reduce data recovery time, the recovery operation may be performed by checking only the effective journal area.

When the first recovery operation is completed, the valid blocks of the journal areas JA1, JASP, JA3 and JA4 may be transmitted to the external host memory 220 as illustrated in FIG. 23B, and a data structure for searching the transmitted valid blocks may be formed (step S625). From the time the data structure is formed, the storage device 300 may operate in the degraded mode (step S640).

After the first recovery operation is completed and after the data structure is formed, the second recovery operation may be performed to restore the data area DASP of the spare disk DISKSP (step S650), as illustrated in FIG. 23C. Step S650 in FIG. 22 may be substantially the same as step S630 in FIG. 20, and arrows ⓓ, ⓔ and ⓕ and CD in FIG. 23C may be substantially the same as the arrows ⓓ, ⓔ and ⓕ in FIG. 21C.

After the data recovery operation is completed, the replay write operation may be performed in the manner described with reference to FIGS. 13 through 18.

Typically, the storage device may operate in the degraded mode capable of accessing the data in the failed disk by the combination of the normal disks during the data recovery operation. However, the degraded mode may not be utilized in an example of FIG. 20 because the valid latest data of the journal area is not reflected in the data area, and thus the storage device may not be accessed until the data recovery operation and the replay write operation are completed.

In an example of FIG. 22, the journal area may be restored first, the restored data in the journal area may be transmitted to the host memory 220 to form the data structure, and then the degraded mode may be utilized during the data recovery operation and the replay write operation. For example, when an access request is received from the host device 200 during operation in the degraded mode, the data structure of the journal area formed in the host memory 220 may be searched to check whether the latest data exists in the journal area and reflect the latest data. If the access request is not related to the data in the journal area, data in the data area may be reflected. When the restoration of the data area is completed, the valid data of the journal area may be reflected in the data area, the degraded mode may be terminated, and the storage device 300 may start operating in a normal mode. Thus, performance of the storage device 300 may be improved or enhanced.

Figure 24:
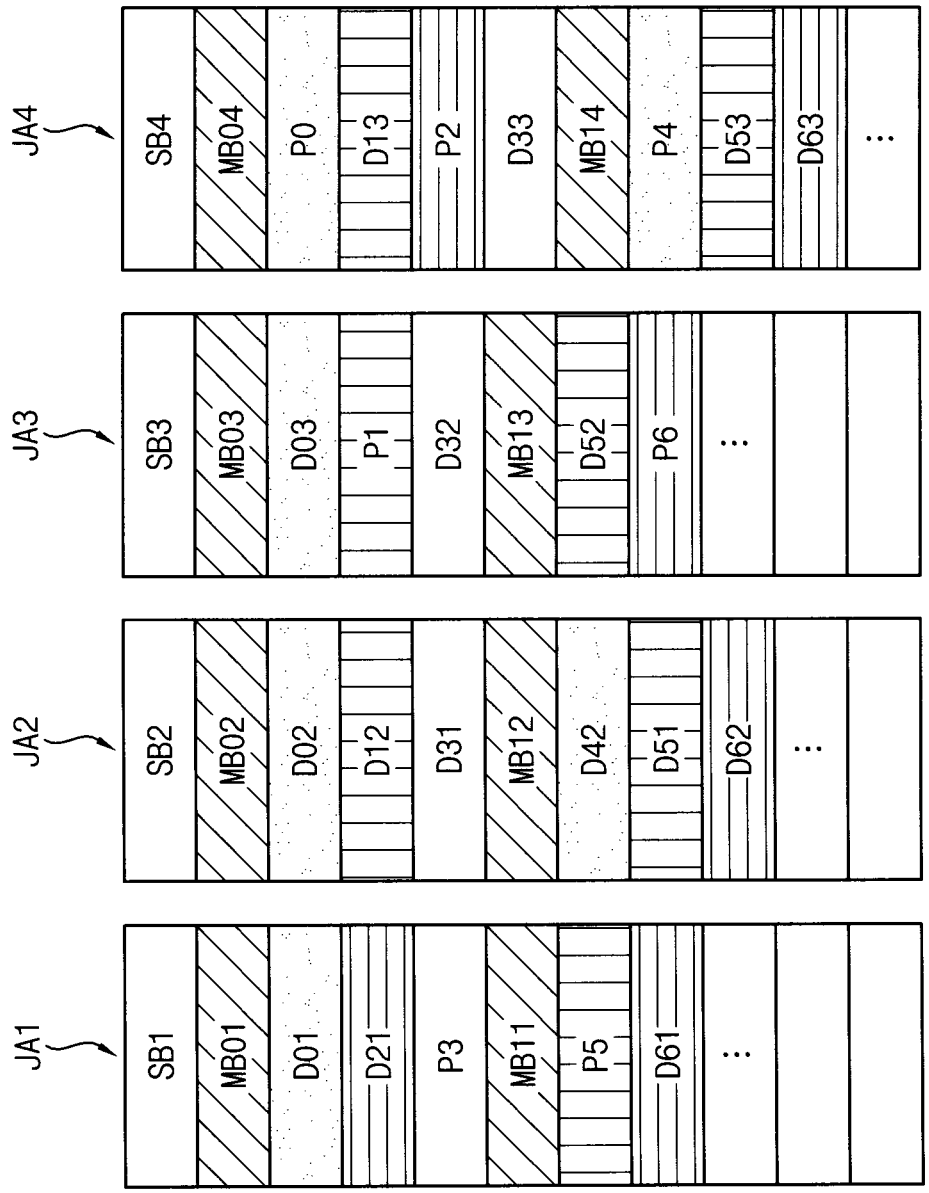
FIG. 24 is a diagram illustrating still another example of a journal area included in a storage device according to example embodiments.

FIG. 24 is a diagram illustrating still another example of a journal area included in a storage device according to example embodiments. FIG. 25 is a diagram illustrating an example of a meta block included in the journal area of FIG. 24. The descriptions repeated with respect to FIG. 3 will be omitted.

Referring to FIG. 24, the journal areas JA1~JA4 may include super blocks SB1~SB4, meta blocks MB01~MB14, and data blocks D01, D02, D03, P0, D12, P1, D13, D21, P2, P3, D31, D32, D33, D42, P4, P5, D51, D52, D53, D61, D62, P6 and D63.

Compared with respect to FIG. 3, only modified data blocks in one stripe may be stored in the journal areas JA1~JA4 in FIG. 24.

In an example of FIG. 3, when existing data (or old data) is updated with new data, all the data blocks included in one stripe may not be always modified. For example, some data blocks may be modified and some other data blocks may be maintained. However, the write operation should be always performed by units of a stripe, and thus both the modified data block and the unmodified data block should be written to the data area at once even if only a part of the data block is modified. For example, in FIG. 3, all the data blocks D01, D02, D03 and P0 in the stripe STR0 may be written into the journal areas JA1~JA4 irrespective of whether they are modified or not, and then the data blocks D01, D02, D03 and P0 in the journal areas JA1~JA4 may be written into the data areas DA1~DA4.

On the other hand, in an example of FIG. 24, only the modified data block may be written into the journal areas JA1~JA4. For example, in the stripe STR0, all the data blocks D01, D02 and D03 may be modified and written, and thus the parity block P0 may be modified and written. In the stripe STR1, only some data blocks D12 and D13 may be modified and written, the data block D11 may not be modified and may not be written, and thus the parity block P1 may be modified and written. If one or more data blocks in one stripe are modified, the parity block should always be modified. When the stripe STR1 is to be written in the data areas DA1~DA4, the blocks D12, P1 and D13 in the journal areas JA2, JA3 and JA4 and the existing data block (e.g., D11) in the data area DA1 may be used to write the stripe STR1 into the data areas DA1~DA4.

Similarly, in the stripes STR2 and STR3, only some data blocks D21, D31, D32 and D33 may be modified and written, and thus the parity blocks P2 and P3 may be modified and written. In the stripes STR4, STR5 and STR6, only some data blocks D42, D51, D52, D53, D61, D62 and D63 may be modified and written, and thus the parity blocks P4, P5 and P6 may be modified and written.

As described above, a storage space of the journal areas JA1~JA4 may be saved by storing only the modified data block. Such scheme may be referred to as a small write scheme or a small write optimization operation scheme.

Referring to FIG. 25, an example of the meta blocks MB01~MB04 corresponding to the transaction TRS0 is illustrated in FIG. 25.

As described with reference to FIG. 24, when only the modified data block is stored into the journal areas JA1~JA4, it may be marked in the meta block that an unmodified block has not been written to the journal area.

For example, since the data blocks D01, D21 and P3 for the stripes STR0, STR2 and STR3 are written into the journal area JA1 of the disk DISK1 and the block P3 stores parity data, "exist (EST)" may be marked in the attributes of the stripes STR0, STR2 and STR3, and "non-exist (NEST)" may be marked in the attribute of the stripe STR1. In addition, "parity (PRT)" may be marked in the attribute of the stripe STR3. Similarly, the attributes of the stripes STR0, STR1, STR2 and STR3 in the disks DISK2, DISK3, . . . may be marked.

Further, since the block addresses of disks included the same stripe are arranged on the same line, "next-non-address (NADDR)" may be marked in the attribute of the last stripe STR3 of the disk DISK1, and the final location block addresses of the disks DISK2, DISK3, . . . may be omitted. In other words, when the "non-address (NADDR)" is marked, the final location block addresses of the other disks DISK2, DISK3, . . . may be substantially the same as the final location block address of the disk DISK1.

Additionally, in a case of using the small write scheme, since the offsets of the meta blocks included the same transaction are different from each other, offset information of the meta blocks of all the disks may be recorded in the super blocks. The meta blocks MB01~MB04 may share the final location block address information and the attribute information.

Figure 26:
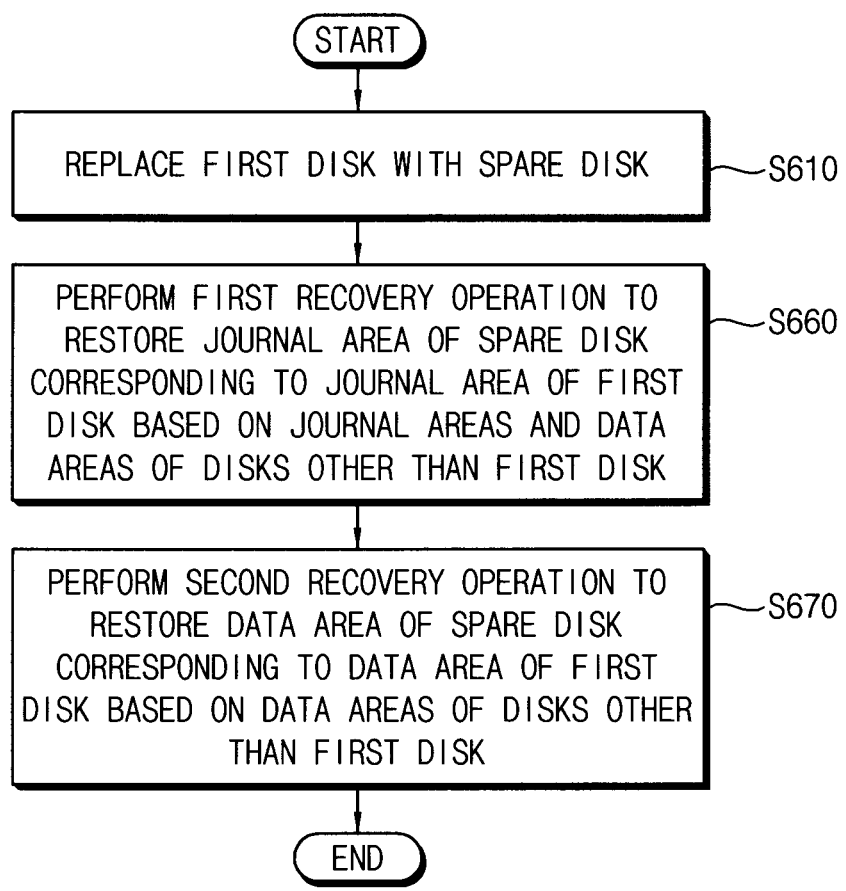
FIG. 26 is a flowchart illustrating still another example of performing a data recovery operation in the method of FIG. 19.
Figure 27A:
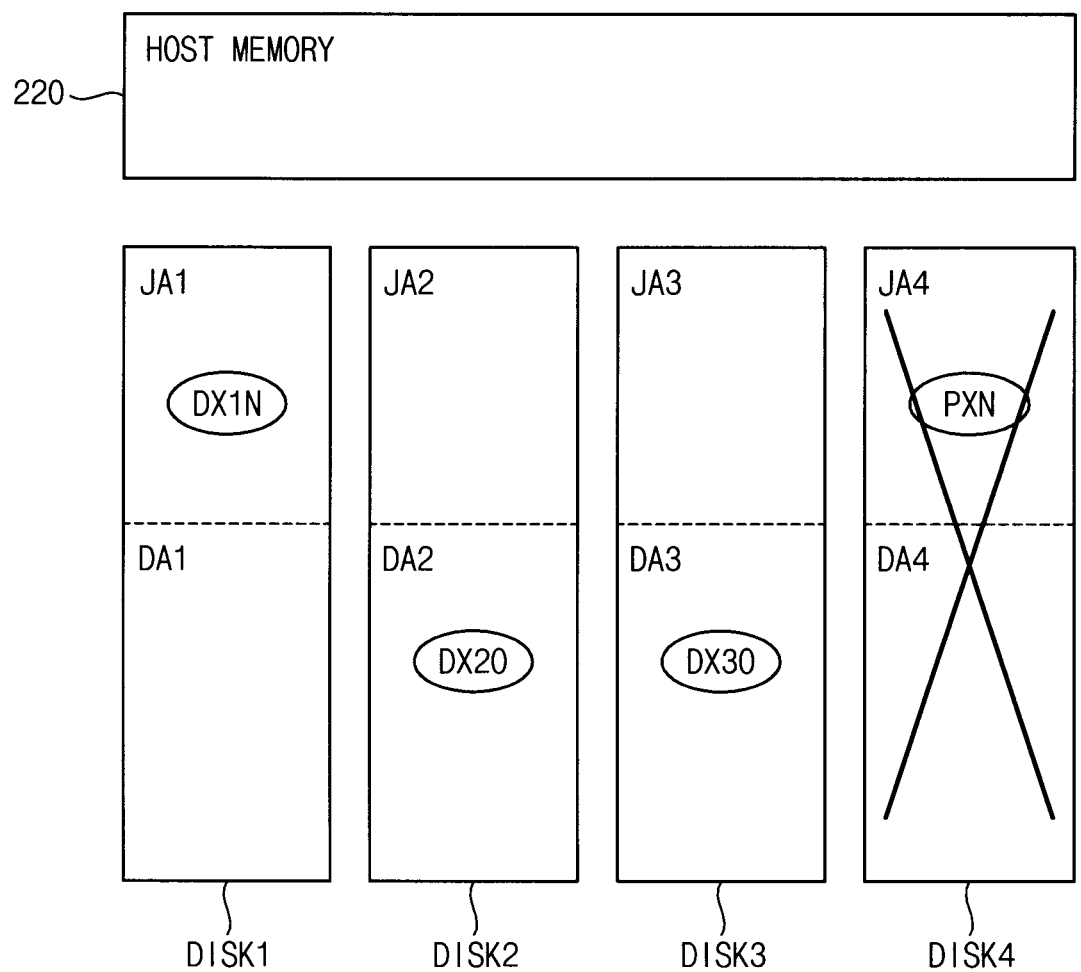
FIGS. 27A, 27B and 27C are diagrams for describing the data recovery operation in FIG. 26.
Figure 27B:
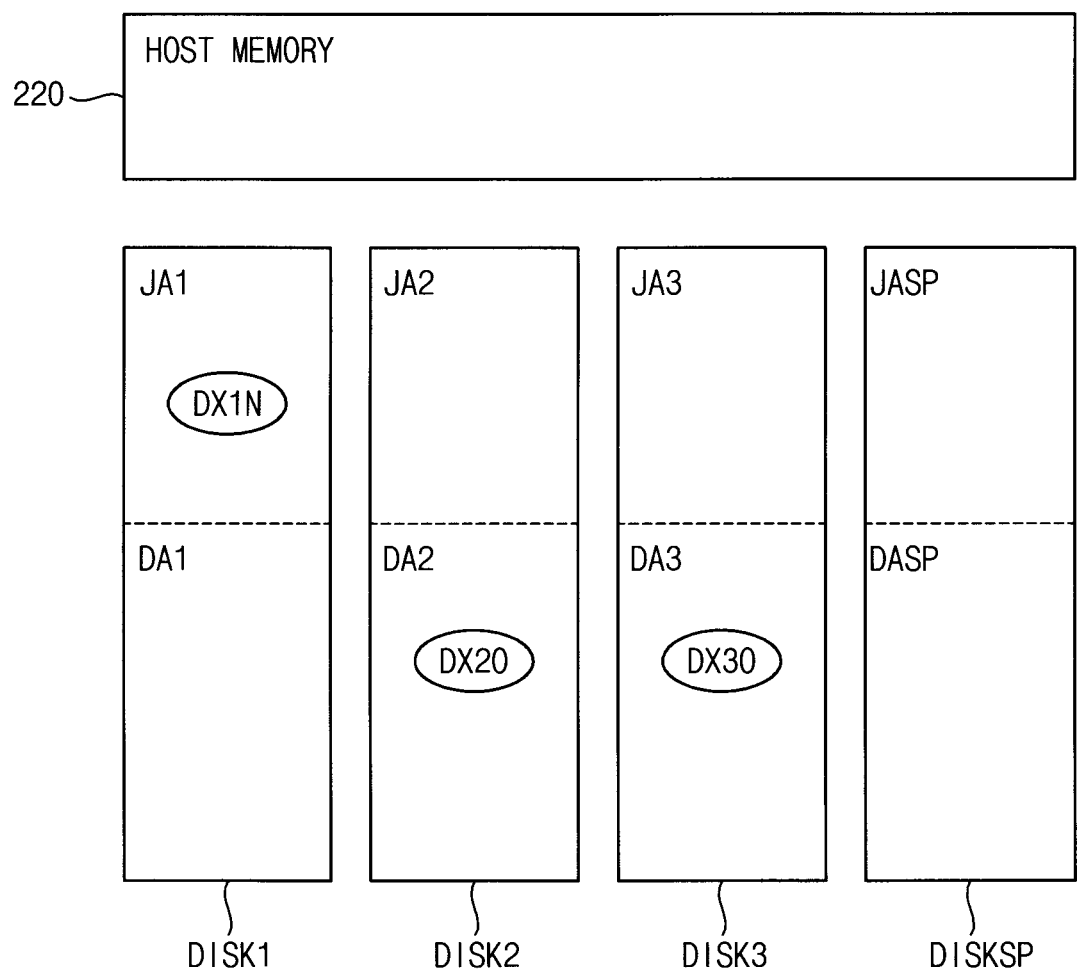
Figure 27C:
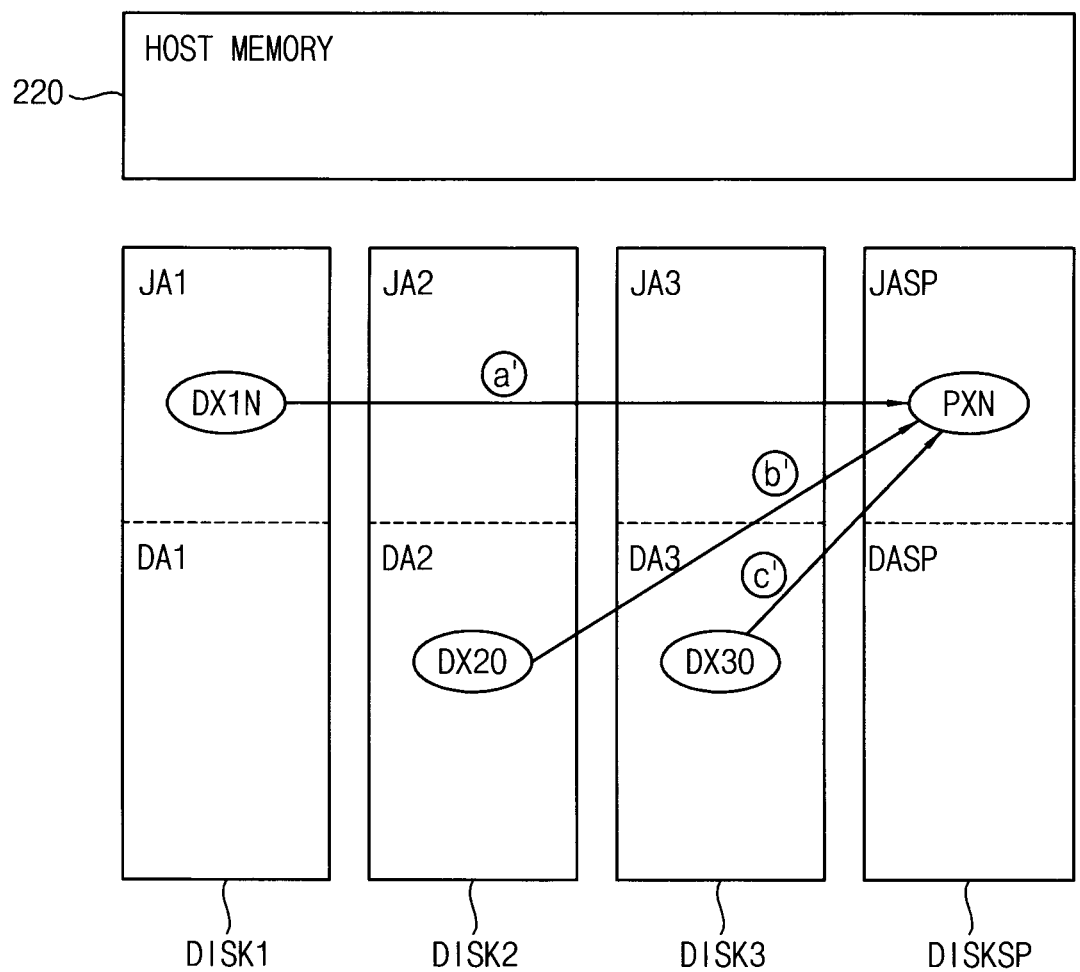

FIG. 26 is a flowchart illustrating still another example of performing a data recovery operation in the method of FIG. 19. FIGS. 27A, 27B and 27C are diagrams for describing the data recovery operation in FIG. 26. The descriptions repeated with respect to FIGS. 20, 21A, 21B, 21C, 22, 23A, 23B and 23C will be omitted.

Referring to FIGS. 19, 24, 25, 26, 27A, 27B and 27C, when performing the data recovery operation, step S610 in FIG. 26 may be substantially the same as step S610 in FIG. 20. For example, as illustrated in FIGS. 27A and 27B, the failed disk DISK4 may be replaced with the spare disk DISKSP.

As with an example of FIG. 20, the first and second recovery operations may be performed to restore the data in the failed disk DISK4. In an example of FIG. 26, the recovery operation of the journal area may be changed because the data is stored based on the small write scheme described with reference to FIGS. 24 and 25.

For example, the first recovery operation may be performed to restore the journal area JASP of the spare disk DISKSP corresponding to the journal area JA4 of the failed disk DISK4 based on the journal areas and the data areas of the disks DISK1, DISK2 and DISK3 among the target disks other than the failed disk DISK4 (step S660). Since modified data block DX1N and modified parity block PXN were stored in the journal areas JA1 and JA4, respectively, and since unmodified data blocks DX20 and DX30 were stored in the data areas DA2 and DA3, respectively, the journal area JA4 may be restored by using the journal area JA1 and the data areas DA2 and DA3. Arrows ⓐ', ⓑ' and ⓒ' in FIG. 27C may correspond to the first recovery operation.

The second recovery operation may be performed to restore the data area DASP of the spare disk DISKSP (step S670). Step S670 may be performed simultaneously with the first recovery operation, as in step S630 of FIG. 20, or may be performed after the first recovery operation is completed as in step S650 of FIG. 22.

Figure 28:
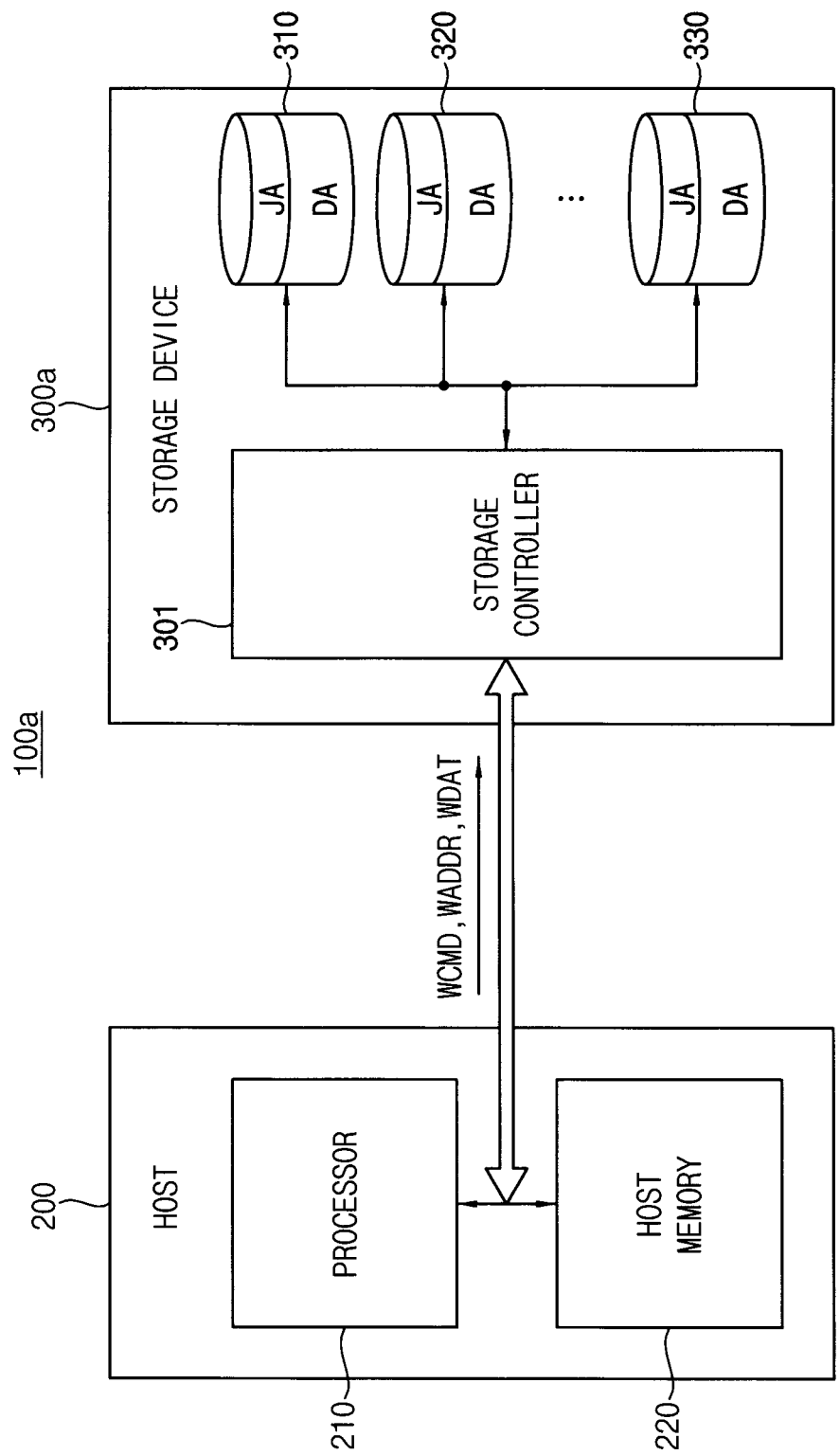
FIG. 28 is a block diagram illustrating a storage device and a storage system including the storage device according to example embodiments.

FIG. 28 is a block diagram illustrating a storage device and a storage system including the storage device according to example embodiments. The descriptions repeated with respect to FIG. 2 may be omitted.

Referring to FIG. 28, a storage system 100a includes a host device 200 and a storage device 300a.

The storage system 100a and the storage device 300a in FIG. 28 may be substantially the same as the storage system 100 and the storage device 300 in FIG. 2, respectively, except that the storage device 300a in FIG. 28 further includes a storage controller 301.

The storage controller 301 may control an operation of the storage device 300a. The storage system 100a of FIG. 28 may be a hardware RAID system where a RAID architecture is provided with a RAID controller (e.g., the storage controller 301).

Although not illustrated in FIG. 28, the storage device 300a may further include an auxiliary power supply that is connected to the storage controller 301.

Figure 29:
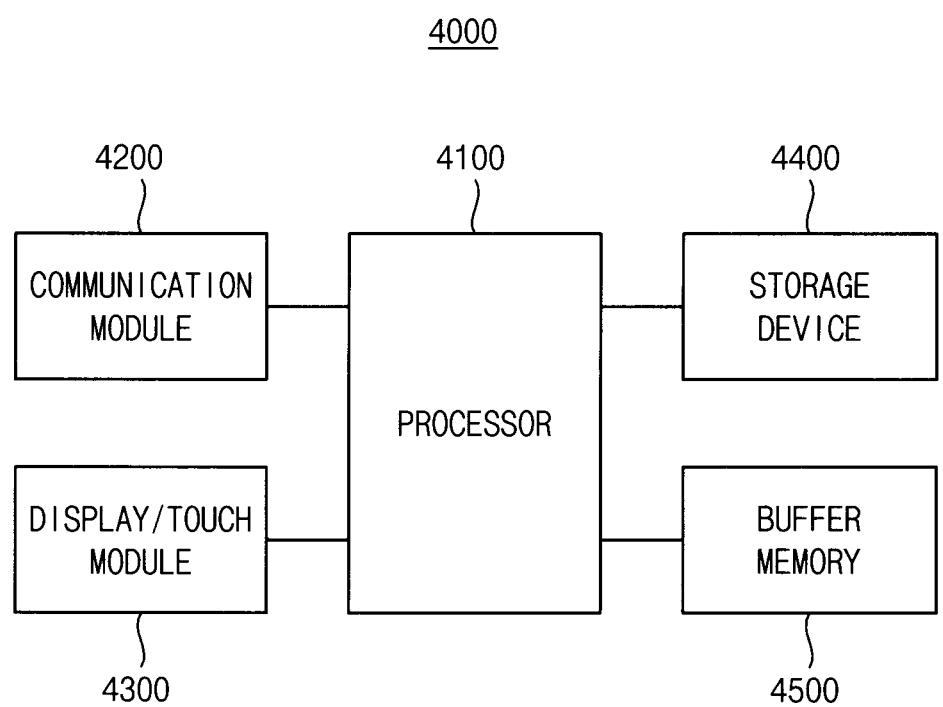
FIG. 29 is a block diagram illustrating an electronic system according to example embodiments.

FIG. 29 is a block diagram illustrating an electronic system according to example embodiments.

Referring to FIG. 29, an electronic system 4000 includes at least one processor 4100, a communication module 4200, a display/touch module 4300, a storage device 4400, and a buffer memory 4500.

The processor 4100 controls operations of the electronic system 4000. The processor 4100 may execute an operating system and at least one application to provide an internet browser, games, videos, or the like. The communication module 4200 is implemented to perform wireless or wire communications with an external device. The display/touch module 4300 is implemented to display data processed by the processor 4100 and/or to receive data through a touch panel. The storage device 4400 is implemented to store user data and is driven based on the method of operating the storage device according to example embodiments. The buffer memory 4500 temporarily stores data used for processing operations of the electronic system 4000.

The disclosure may be applied to various electronic devices and electronic systems including the storage device and the storage system. For example, the disclosure may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed and that modifications to the disclosed example embodiments, as well as other example embodiments, are intended to be included within the scope of the appended claims.

What is claimed is:

1. A method executed by a storage device including a plurality of disks, the method comprising:
   dividing the plurality of disks into a plurality of journal areas and a plurality of data areas, respectively;
   when a write command for target disks among the plurality of disks is received, performing a first write operation that writes target data from a memory of an external host device into journal areas of the target disks, the target disks being included in a same array; and
   after the first write operation is completed, performing a second write operation that writes the target data from the memory of the external host device into data areas of the target disks.

2. The method of claim 1, wherein:
   performing the first write operation includes:
   storing first data included in the target data into a first data block included in a first disk among the target disks, the first data block having a first physical block address; and
   mapping a first logical block address indicating a journal area of the first disk with the first physical block address, and
   performing the second write operation includes:
   storing the first data into a second data block included in the first disk, the second data block having a second physical block address; and
   mapping a second logical block address indicating a data area of the first disk with the second physical block address.

3. The method of claim 1, further comprising after the second write operation is completed, releasing the target data stored in the journal areas of the target disks.

4. The method of claim 1, wherein:
   each of the first write operation and the second write operation is performed for the target disks at one time by units of a stripe and by units of a transaction including two or more stripes, and
   each of the plurality of journal areas includes:
   a super block configured to store initial transaction information associated with an initial transaction indicating a start point of a replay write operation, and size information of each of the plurality of journal areas;
   a meta block configured to store identification (ID) information of a current transaction, final location block address information of the current transaction, attribute information of the current transaction, and checksum information for checking validity of the current transaction; and
   a data block configured to store data of the current transaction.

5. The method of claim 4, wherein at least a part of the information that are stored in the super block and the meta block are shared by the target disks included in the same array.

6. The method of claim 4, wherein each of the plurality of journal areas further includes a commit block configured to ensure that write operations for the current transaction are successfully completed.

7. The method of claim 4, wherein only a modified data block among data blocks in one stripe is stored in the plurality of journal areas.

8. The method of claim 1, further comprising when the storage device is rebooted after a power failure occurs on the storage device, performing a replay write operation on the data areas of the target disks based on the journal areas of the target disks.

9. The method of claim 8, wherein performing the replay write operation includes:
   determining a start point of the replay write operation by reading super blocks from the journal areas of the target disks;
   checking validity by reading meta blocks and data blocks associated with the start point of the replay write operation from the journal areas of the target disks; and
   when the meta blocks and the data blocks are valid, writing data included in the data blocks into the data areas of the target disks.

10. The method of claim 9, wherein an operation of writing the data included in the data blocks into the data areas of the target disks is internally performed by the storage device based on a move command or a share command.

11. The method of claim 8, wherein performing the replay write operation includes:

determining a start point of the replay write operation by reading super blocks from the journal areas of the target disks;

checking validity by reading meta blocks and commit blocks associated with the start point of the replay write operation from the journal areas of the target disks; and when the meta blocks and the commit blocks are valid, writing data included in data blocks into the data areas of the target disks, the data blocks being included in the journal areas of the target disks and corresponding to the meta blocks and the commit blocks.

12. The method of claim 1, further comprising when the storage device is rebooted after a power failure occurs on the storage device and a disk failure occurs on a first disk among the target disks, performing a data recovery operation on the first disk.

13. The method of claim 12, wherein performing the data recovery operation includes:

replacing the first disk with a spare disk;

performing a first recovery operation to restore a journal area of the spare disk corresponding to a journal area of the first disk based on journal areas of disks among target disks other than the first disk; and performing a second recovery operation to restore a data area of the spare disk corresponding to a data area of the first disk based on data areas of the disks among the target disks other than the first disk.

14. The method of claim 13, wherein the first recovery operation and the second recovery operation are simultaneously performed.

15. The method of claim 13, wherein the second recovery operation is performed after the first recovery operation is completed.

16. The method of claim 12, wherein performing the data recovery operation includes:

replacing the first disk with a spare disk;

performing a first recovery operation to restore a journal area of the spare disk corresponding to a journal area of the first disk based on journal areas and data areas of disks among target disks other than the first disk; and performing a second recovery operation to restore a data area of the spare disk corresponding to a data area of the first disk based on the data areas of the disks among the target disks other than the first disk.

17. A storage device comprising:

a plurality of disks configured to be divided into a plurality of journal areas and a plurality of data areas, respectively, wherein:

when a write command for target disks among the plurality of disks is received, a first write operation is performed to store target data to be written into journal areas of the target disks, the target disks are included in a same array, and after the first write operation is completed, a second write operation is performed to store the target data into data areas of the target disks, wherein:

each of the first write operation and the second write operation is performed for the target disks at one time by units of a stripe and by units of a transaction including two or more stripes, and each of the plurality of journal areas includes:

a super block configured to store initial transaction information associated with an initial transaction indicating a start point of a replay write operation, and size information of each of the plurality of journal areas;

a meta block configured to store identification (ID) information of a current transaction, final location block address information of the current transaction, attribute information of the current transaction, and checksum information for checking validity of the current transaction; and a data block configured to store data of the current transaction.

18. The storage device of claim 17, wherein:

performing the first write operation includes:

storing first data included in the target data into a first data block included in a first disk among the target disks, the first data block having a first physical block address; and mapping a first logical block address indicating a journal area of the first disk with the first physical block address, and performing the second write operation includes, based on a move command, mapping a second logical block address indicating a data area of the first disk with the first physical block address while releasing the mapping between the first logical block address and the first physical block address.

19. The storage device of claim 17, wherein:

performing the first write operation includes:

storing first data included in the target data into a first data block included in a first disk among the target disks, the first data block having a first physical block address; and mapping a first logical block address indicating a journal area of the first disk with the first physical block address, and performing the second write operation includes, based on a share command, mapping a second logical block address indicating a data area of the first disk with the first physical block address while maintaining the mapping between the first logical block address and the first physical block address.

20. A storage system comprising:

a host device; and a storage device controlled by the host device and including a plurality of disks configured to be divided into a plurality of journal areas and a plurality of data areas, respectively, wherein:

when a write command and target data to be written are provided from the host device, the storage device is configured to perform a first write operation that writes the target data from a memory of the host device into journal areas of target disks among the plurality of disks and a second write operation that writes the target data from the memory of the host device into data areas of the target disks after the first write operation is completed, and the target disks are included in a same array.

* * * * *